United States Patent
Abe et al.

(10) Patent No.: US 7,488,412 B2
(45) Date of Patent: Feb. 10, 2009

(54) HONEYCOMB STRUCTURAL BODY, HONEYCOMB FILTER, AND METHOD OF MANUFACTURING THE STRUCTURAL BODY AND THE FILTER

(75) Inventors: Fumio Abe, Handa (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 748 days.

(21) Appl. No.: 10/482,299

(22) PCT Filed: Jun. 18, 2002

(86) PCT No.: PCT/JP02/06035
§ 371 (c)(1), (2), (4) Date: Dec. 30, 2003

(87) PCT Pub. No.: WO03/008165
PCT Pub. Date: Jan. 30, 2003

(65) Prior Publication Data
US 2004/0131512 A1 Jul. 8, 2004

(30) Foreign Application Priority Data
Jul. 13, 2001 (JP) .............................. 2001-214537
Jul. 13, 2001 (JP) .............................. 2001-214557

(51) Int. Cl.
B01D 53/34 (2006.01)
F01N 3/28 (2006.01)
(52) U.S. Cl. ........................................ 208/180; 208/179
(58) Field of Classification Search ................. 422/177, 422/179, 180
See application file for complete search history.

(56) References Cited

U.S. PATENT DOCUMENTS

| 4,455,180 | A | * | 6/1984 | Hillman et al. ............. 422/180 |
| 5,098,763 | A | | 3/1992 | Horikawa et al. |
| 5,108,685 | A | | 4/1992 | Kragle |
| 5,262,102 | A | | 11/1993 | Wada |
| 5,314,650 | A | * | 5/1994 | Adler et al. ................. 264/630 |

(Continued)

FOREIGN PATENT DOCUMENTS

JP 49-17851-01 5/1947

(Continued)

OTHER PUBLICATIONS

A. Yamuna et al., Kaolin-Based Cordierite for Pollution Control, 24 J. Eur. Ceram. Soc. 65-73 (2004).*

*Primary Examiner*—Glenn Caldarola
*Assistant Examiner*—Randy Boyer
(74) *Attorney, Agent, or Firm*—Oliff & Berridge, PLC

(57) ABSTRACT

There is disclosed a honeycomb structural body (1) comprising: a plurality of through channels (3) formed by a plurality of partition walls (2) in an axial direction. The honeycomb structural body (1) is constituted of a plurality of honeycomb sections (10, 11) formed of materials having different characteristics, and the plurality of honeycomb sections (10, 11) are directly bonded to and integrated with one another. According to the structure of this honeycomb structural body, different high performances can be fulfilled in accordance with requests for each honeycomb section. Additionally, there is not any local stress concentration by shape mismatch of each honeycomb section or presence of a bond material, and reliability at the time of use, and the like can be enhanced.

52 Claims, 13 Drawing Sheets

U.S. PATENT DOCUMENTS

| | | | | |
|---|---|---|---|---|
| 5,538,697 | A | * | 7/1996 | Abe et al. .................... 422/171 |
| 5,884,473 | A | * | 3/1999 | Noda et al. .................. 422/177 |
| 5,964,991 | A | * | 10/1999 | Kawasaki et al. ........... 204/282 |

FOREIGN PATENT DOCUMENTS

| | | |
|---|---|---|
| JP | A 55-155742 | 12/1980 |
| JP | U 62-130116 | 8/1987 |
| JP | U 62-132214 | 8/1987 |
| JP | A 2-86408 | 3/1990 |
| JP | A 5-261716 | 10/1993 |
| JP | Y2 55-28818 | 10/1993 |
| JP | A 7-232084 | 9/1995 |
| JP | A 2000-225340 | 8/2000 |
| JP | A 2000-238022 | 9/2000 |
| JP | A 2000-279729 | 10/2000 |
| JP | A 2000-280222 | 10/2000 |
| JP | WO 01/04466 A1 | 1/2001 |

* cited by examiner

HONEYCOMB STRUCTURAL BODY, HONEYCOMB FILTER, AND METHOD OF MANUFACTURING THE STRUCTURAL BODY AND THE FILTER

TECHNICAL FIELD

The present invention relates to a honeycomb structural body, more particularly to a honeycomb structural body including a plurality of functions which differ with each specific portion, especially to a honeycomb structural body suitable for an exhaust gas purification system, a heat exchanger, a solid electrolytic battery, a thermoacoustic engine of an acoustic wave cooling apparatus, and the like.

BACKGROUND ART

With respect to exhaust gas purification means, various attempts have heretofore been made as follows:

① exhaust gas purification means for using a catalytic body carrying a metal having a catalytic function in partition walls of a honeycomb structural body to decompose components such as hydrocarbon, carbon monoxide, and nitrogen oxides in exhaust gas by oxidation-reduction reaction;

② exhaust gas purification means for trapping and removing particulate materials in the exhaust gas by the partition walls in a structure in which the partition walls of the honeycomb structural body are constituted of porous materials, predetermined through channels are plugged at one end of through channels formed by the partition walls, and the remaining through channels are plugged at the other end; and ③ exhaust gas purification means for adsorbing/removing hydrocarbon components in exhaust gas by adsorption layers which are formed of zeolite, activated carbon, and the like and which are disposed on the partition walls of the honeycomb structural body.

Moreover, in recent years, as exhaust gas regulation is strengthened, there has been a demand for a higher purification performance, and an exhaust gas purification system by a combination of the above-described different exhaust gas purification means has been developed as one of the attempts which meet the demand.

For example, in JP-A-7-232084, a honeycomb structural body has been disclosed in which a columnar honeycomb structural body is bonded to a hollow cylindrical honeycomb structural body via a low-thermal expansion ceramic bond material and the honeycomb structural bodies have different partition wall thicknesses and cell densities.

However, in this honeycomb structural body, it has been necessary to separately manufacture the respective honeycomb structural bodies so that shapes of both the bodies are precisely matched with each other. This complicates manufacturing steps and increases manufacturing costs, and looseness, disengagement, and the like of a bonded portion caused by mismatch between both the shapes have easily occurred.

Moreover, in the honeycomb structural body, stress is easily concentrated on the bonded portion, and there has been a problem that the looseness, disengagement, and the like of the bonded portion are easily caused by mechanical and thermal shocks during transport between the steps, or coating of the catalyst or an absorbent material, canning or actual using, and the like.

On the other hand, in WO01/04466, a honeycomb structural body has been disclosed in which a catalytic body is directly integrated with a filter.

However, in this honeycomb structural body, a technique of simultaneously and integrally manufacturing bodies of materials having different characteristics has not heretofore been developed with respect to a ceramic honeycomb structural body. For this and another reasons, although performances required by the catalytic body and the filter are largely different from each other, the whole honeycomb structural body is constituted of the materials having the same characteristics, and original performances demanded for the catalytic body and filter cannot sufficiently be fulfilled.

Moreover, in the same publication, an exhaust gas purification apparatus is disclosed including: the honeycomb structural body in which the catalytic body is formed integrally with the filter; and a metal case in which the honeycomb structural body is held and which includes an exhaust gas introductory tube abutting on a portion of the catalytic body of the honeycomb structural body.

However, in this exhaust gas purification apparatus, a honeycomb section which is a portion allowed to function as the catalytic body is allowed to abut on the introductory tube for introducing the exhaust gas so as to secure a path of the exhaust gas, but the end of the honeycomb structural body allowed to abut on the introductory tube is flat. Therefore, when the end of the honeycomb structural body is continuously loaded with large thermal shock and vibration, the exhaust gas leaks out of a desired path via a gap between the introductory tube and the end, and a sufficiently purification performance cannot sometimes be obtained.

DISCLOSURE OF THE INVENTION

The present invention has been developed in consideration of the above-described problems, and a first object is to provide a honeycomb structural body which can fulfill a different high performance as required for each honeycomb section and in which there is not concentration of local stress by shape mismatch of the respective honeycomb sections or presence of a bond material and which is high in reliability at the time of use, and the like.

Moreover, a second object of the present invention is to provide a honeycomb structural body which has a plurality of functions different with each specific portion and in which fluids such as exhaust gas can be charged into each specific portion of the honeycomb structural body without being allowed to leak via a path other than a desired path even by use for a long time and which can fulfill a high exhaust gas purification performance, and a canning structural body using the honeycomb structural body.

Furthermore, a third object of the present invention is to provide a manufacturing method in which the honeycomb structural body having the above-described superior characteristics can be manufactured by easy and secure steps at low cost.

The present inventor has carried out intensive studies so as to achieve these objects. Puddles formed of materials having different characteristics after fired are simultaneously extruded to mold the honeycomb structural body. Accordingly, honeycomb sections having different functions are constituted of materials having different characteristics in accordance with desired performances to obtain the honeycomb structural body in which the respective honeycomb sections are directly bonded to one another not via bond materials. According to the honeycomb structural body and a method of manufacturing the body, the above-described first and third objects can be achieved. Such findings have been reached and the present invention has been completed. Moreover, the present inventor has found that the second object can be achieved, when a concave or convex structure is disposed in at least one end including a through channel of the honeycomb structural body and an exhaust tube is disposed in a portion of the end including the convex or concave structure, and has completed the present invention.

That is, according to the present invention, there is provided a honeycomb structural body comprising: a plurality of through channels formed by a plurality of partition walls in an axial direction, characterized in that the honeycomb structural body is constituted of a plurality of honeycomb sections formed of materials having different characteristics, and the plurality of honeycomb sections are directly bonded to and integrated with one another.

In the present invention, the plurality of honeycomb sections formed of the materials which have different characteristics are preferably constituted of first honeycomb sections disposed in a middle region including a center axis of the honeycomb structural body and second honeycomb sections disposed in an outer peripheral region which surrounds the middle region and which is disposed adjacent to the middle region.

Moreover, in the present invention, the plurality of honeycomb sections are preferably constituted of materials which are different from one another in at least one of porosity, average pore diameter, and water absorption. In this case, for the material constituting each honeycomb section, the porosity is preferably 5 to 80%, the average pore diameter is preferably 0.5 to 100 μm, and the water absorption is preferably 1 to 95%.

Furthermore, in the present invention, further the honeycomb structural body is preferably constituted of a plurality of honeycomb sections which are different from one another in at least one of cell structures such as cell density, partition wall thickness, and sectional shape in the through channels in a diametric direction. In this case, the plurality of honeycomb sections different in the cell structure are preferably disposed substantially facing to the plurality of honeycomb sections formed of the materials having different characteristics.

Additionally, the plurality of honeycomb sections different in the cell structure preferably have a cell density of 0.155 to 3.101 cells/mm$^2$ (100 to 2000 cells/square inch), and preferably have a partition wall thickness of 25 to 500 μm.

Moreover, for the honeycomb structural body in the present invention, a convex or concave structure is preferably disposed in at least one end through which the through channel extends.

Furthermore, the convex or concave structure is preferably disposed in an outer peripheral portion or a middle portion of at least one end through which the through channel extends.

Additionally, the end including the convex structure has a step of 2 mm or more, and the step preferably has a size which is not more than a diameter in a root position of the convex structure. The end including the concave structure has a step of 2 mm or more, and the step preferably has a size which is not more than an inner diameter in a bottom position of the concave structure.

Moreover, examples of the shape of the convex or concave structure include a prismatic shape, a columnar shape, a tapered shape, and the like. In the convex structure having the tapered shape, a tip end preferably has a planar portion. In the concave structure having the tapered shape, a bottom portion preferably has the planar portion. The convex or concave structure having the tapered shape may be disposed in one end through which the through channel extends, and the convex or concave structure having the same diametrically sectional shape in an axial direction, such as the prismatic shape and the columnar shape, may also be disposed in the other end through which the through channel extends.

In the present invention, an outer peripheral side surface of the convex structure disposed in the end, or an inner peripheral side surface of the concave structure disposed in the end is preferably coated with a ceramic material.

Moreover, in the present invention, the convex or concave structure disposed in the end is preferably disposed facing to each honeycomb section constituted of the materials having different characteristics.

In the present invention, the examples of the material constituting the plurality of honeycomb sections include at least one selected from a group consisting of cordierite, silicon carbide, silicon nitride, alumina, mullite, lithium aluminum silicate, aluminum titanate, and zirconia.

Moreover, in the present invention, for some of the plurality of honeycomb sections, the partition walls may carry metals having catalytic capabilities, or the partition walls may include adsorption layers which adsorb hydrocarbon. Some of the plurality of honeycomb sections may be constituted of the partition walls having filter capabilities. For the through channels formed by the partition walls having the filter capabilities, in opposite ends through which the through channels extend, predetermined through channels are plugged at one end, and the remaining through channels are plugged at the other end. The honeycomb structural body may also be used as a filter for trapping and removing particulate materials included in a dust-containing fluid.

On the other hand, according to the present invention, there is provided a canning structural body comprising: a honeycomb structural body in which a plurality of through channels are formed by a plurality of partition walls in an axial direction; and a case in which the honeycomb structural body is held and which includes an exhaust tube disposed facing to a part (one part in one end) of the honeycomb structural body, characterized in that the honeycomb structural body includes a convex or concave structure in at least one end through which the through channels extend, and the exhaust tube is attached to a portion including the convex or concave structure in the end.

In the canning structural body of the present invention, the exhaust tube is preferably attached to the portion of the end including the convex or concave structure via a holding material, and the convex or concave structure is preferably disposed in an outer peripheral portion or middle portion of at least one end through which the through channels extend.

Moreover, the end including the convex structure includes a step of 2 mm or more, and the step preferably has a size which is not more than a diameter of the convex structure in a root position. The end including the concave structure includes a step of 2 mm or more, and the step preferably has a size which is not more than an inner diameter of the concave structure in a bottom position.

Furthermore, in the canning structural body of the present invention, a shape of the convex or concave structure is not especially limited. For example, a prismatic shape, a columnar shape, or a tapered shape may be formed. However, in the convex structure having the tapered shape, a tip end preferably includes a planar portion. In the concave structure having the tapered shape, a bottom portion preferably includes the planar portion.

Moreover, in the convex or concave structure having the tapered shape, the end of the exhaust tube preferably has a spreading or narrowing shape substantially in accordance with slant surfaces of these structures.

Additionally, in the canning structural body of the present invention, the convex or concave structure having the tapered shape may be disposed in one end through which the through channel extends, and the convex or concave structure having the same diametrically sectional shape in an axial direction, such as the prismatic shape and the columnar shape, may also be disposed in the other end through which the through channel extends.

Moreover, in the canning structural body of the present invention, an outer peripheral side surface of the convex structure or an inner peripheral side surface of the concave structure disposed in the end of the honeycomb structural body is preferably coated with a ceramic material.

It is to be noted that in the canning structural body of the present invention, the examples of the material constituting the plurality of honeycomb sections include at least one selected from a group consisting of cordierite, silicon carbide, silicon nitride, alumina, mullite, lithium aluminum silicate, aluminum titanate, and zirconia.

In the canning structural body of the present invention, the honeycomb structural body is preferably constituted of a plurality of honeycomb sections formed of materials which have different characteristics. In this case, the material characteristic which differs with each honeycomb section is preferably at least one of porosity, average pore diameter, and water absorption.

Moreover, in the canning structural body of the present invention, the honeycomb section corresponding to the convex or concave structure is preferably constituted of the material having the characteristics different from those of another honeycomb section. The honeycomb section corresponding to the convex or concave structure is preferably directly bonded to and integrated with the other honeycomb section.

Furthermore, in the canning structural body of the present invention, the respective honeycomb sections are different from one another in at least one of cell structures such as cell density, partition wall thickness, and sectional shape in the through channel in a diametric direction. In this case, the plurality of honeycomb sections different in the cell structure are preferably disposed substantially facing to the plurality of honeycomb sections formed of the materials having different characteristics.

Additionally, in the canning structural body of the present invention, for some of the plurality of honeycomb sections, the partition walls may carry metals having catalytic capabilities, or the partition walls may include adsorption layers which have hydrocarbon adsorption capabilities. In some of the plurality of honeycomb sections, the through channels are formed by the partition walls which have filter capabilities. Predetermined through channels are plugged at one end through which the through channels extend, and the remaining through channels are plugged at the other end. The structural body may also be used as a filter for trapping and removing particulate materials included in a dust-containing fluid.

Moreover, in the canning structural body of the present invention, the case preferably includes a channel change member which changes a channel of a fluid which has flown from one honeycomb section to charge the fluid into another honeycomb section.

Furthermore, according to the present invention, there is provided a method of manufacturing a honeycomb structural body by kneading a raw material mainly containing a ceramic material with a medium to obtain puddle, and extrusion molding the puddle to obtain the honeycomb structural body, characterized in that the method comprises the steps of: using a plurality of raw materials having different characteristics after fired as the raw material mainly containing the ceramic material; kneading the plurality of raw materials with the medium in different kneading mechanisms to obtain a plurality of puddles having different characteristics after fired; guiding the plurality of puddles into different positions of a die; and simultaneously extruding the plurality of puddles.

In the present invention, composite puddle obtained by integrating the plurality of puddles is preferably charged into the die, and the plurality of puddles are simultaneously extruded. In this case, as an example of the composite puddle, around one puddle formed of one material, at least one or more puddles whose characteristics after fired are different from those of the one puddle are disposed.

On the other hand, the manufacturing method of the present invention preferably comprises the steps of: guiding the plurality of puddles into the different positions of the die by different extrusion mechanisms to simultaneously extrude the puddles.

In this case, as the extrusion mechanism, a screw type extrusion mechanism is preferable which continuously carries out a series of the kneading of the raw material mainly containing the ceramic material with the medium and the extrusion of the puddle obtained by the kneading. Moreover, the plurality of raw materials preferable differ in at least one of the characteristics after fired, such as the porosity, average pore diameter, and water absorption. Furthermore, for the die, at least one of a cell block pitch, a slit width, and a sectional shape of a cell block in a direction vertical to an extruding direction of the cell block substantially differs with each portion into which the respective puddles having different characteristics after fired are charged.

BEST MODE FOR CARRYING OUT THE INVENTION

Embodiments of the present invention will hereinafter be described concretely with reference to the drawings.

Figure 1:
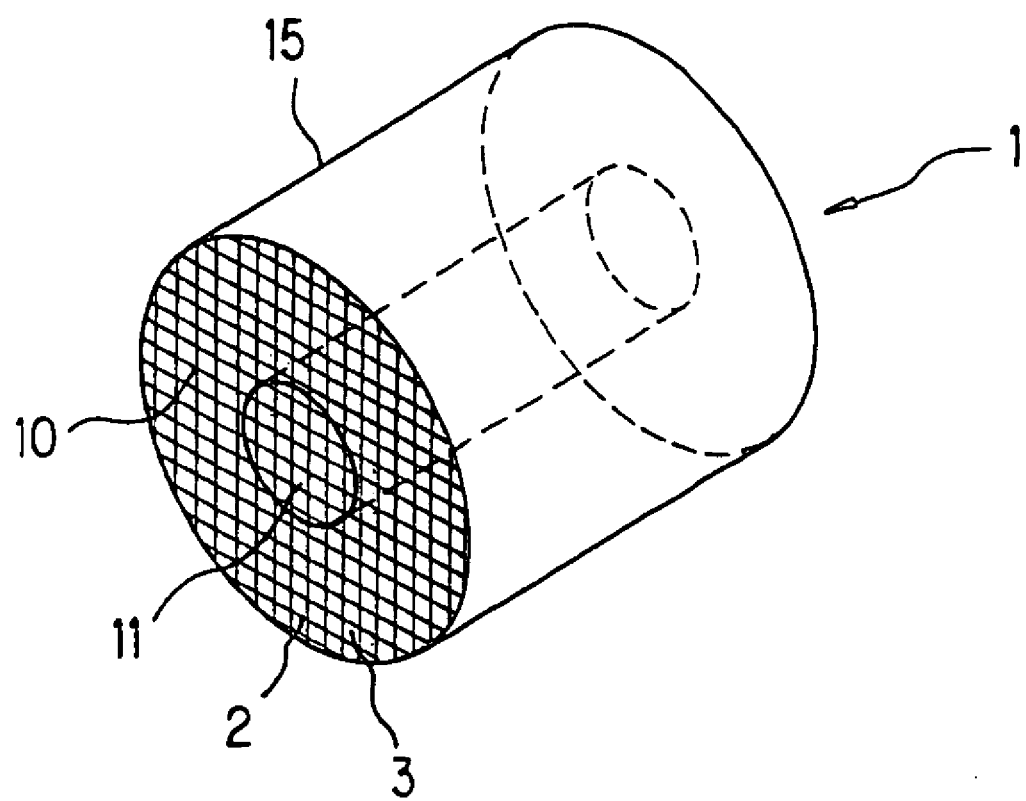
FIG. 1 is a perspective view schematically showing one embodiment in a honeycomb structural body of the present invention.

As shown in FIG. 1, and the like, for a honeycomb structural body 1 of the present invention, a plurality of through channels 3 are formed by a plurality of partition walls 2 in an axial direction. The honeycomb structural body 1 is constituted of a plurality of honeycomb sections 10, 11 formed of materials having different characteristics, and the plurality of honeycomb sections 10, 11 are directly bonded to and integrated with each other.

Accordingly, the respective honeycomb sections 10, 11 can fulfill different high performances in accordance with requested performances. Additionally, a local stress by shape mismatch of the respective honeycomb sections 10, 11 or presence of a bond material is not concentrated, and reliability at the time of use, and the like can be enhanced.

In the present invention, examples of the characteristics of the materials constituting the honeycomb sections 10, 11 include porosity, average pore diameter, water absorption, specific heat, and the like. In the present invention, at least one of these characteristics preferably differs in accordance with performances required by the respective honeycomb sections 10, 11.

For example, in the honeycomb section 10 for use as a catalytic body or an adsorbent, it is preferable to set the porosity to 20 to 40%, the average pore diameter to 1 to 80 µm, and the water absorption to 1 to 40%, and it is more preferable to set the porosity to 25 to 35%, the average pore diameter to 1 to 60 µm, and the water absorption to 4 to 35%.

Moreover, for example, in the honeycomb section 11 for use as a filter, it is preferable to set the porosity to 40 to 80%, and the average pore diameter to 5 to 45 µm, and it is more preferable to set the porosity to 40 to 70%, and the average pore diameter to 10 to 40 µm.

Furthermore, even with the honeycomb sections 10, 11 which impart any performances, in consideration of lightening and strength of the honeycomb structural body 1, it is preferable to set the porosity to 5 to 80%, the average pore diameter to 0.5 to 100 µm, and the water absorption to 1 to 95%, and it is more preferable to set the porosity to 25 to 70%, the average pore diameter to 1 to 60 µm, and the water absorption to 4 to 92%.

In the present invention, the respective honeycomb sections 10, 11 may be constituted by different types of materials to vary the characteristics of the respective honeycomb sections 10, 11, or the respective honeycomb sections 10, 11 may be constituted of the same type of materials different in the characteristics such as the porosity and the pore diameter to vary the characteristics of the respective honeycomb sections 10, 11. It is to be noted that in the latter case, for example, a crystal growth auxiliary agent, pore forming material, and the like can be added into raw materials to constitute the honeycomb structural body 1 whose characteristics such as the porosity and pore diameter differ with the respective honeycomb sections 10, 11.

Moreover, the examples of the materials constituting the respective honeycomb sections 10, 11 can include at least one selected from a group consisting of cordierite, metal silicon, silicon carbide, silicon nitride, alumina, mullite, lithium aluminum silicate, aluminum titanate, and zirconia.

Figure 2:
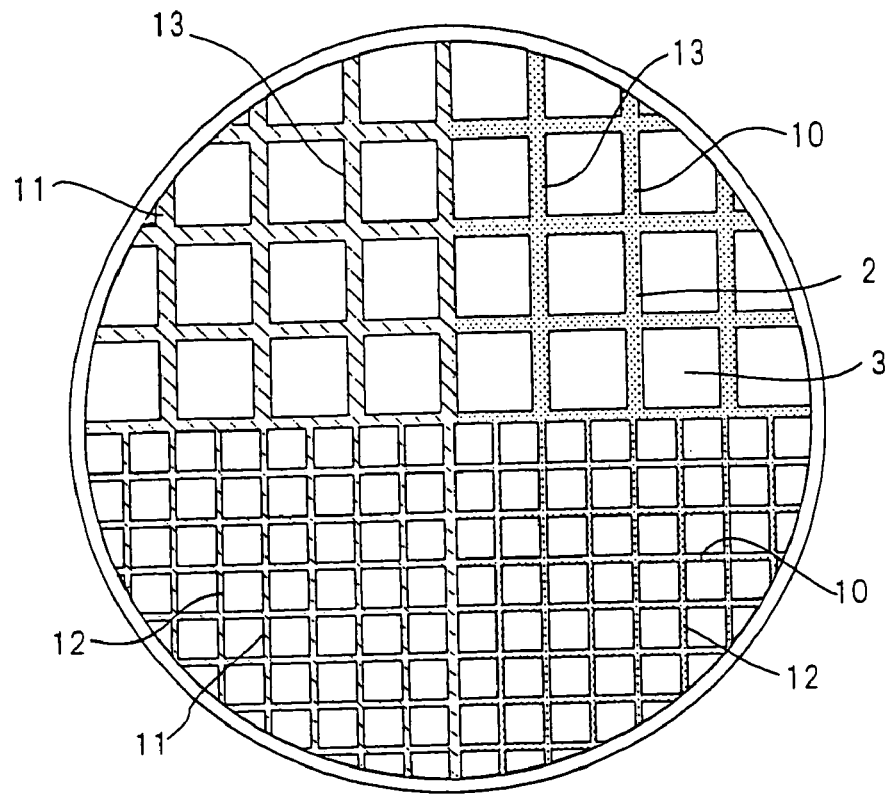
FIG. 2 is a plan view schematically showing one example of an arrangement relation between a plurality of honeycomb sections formed of materials having different characteristics and those having different cell structures in the honeycomb structural body of the present invention.
Figure 3:
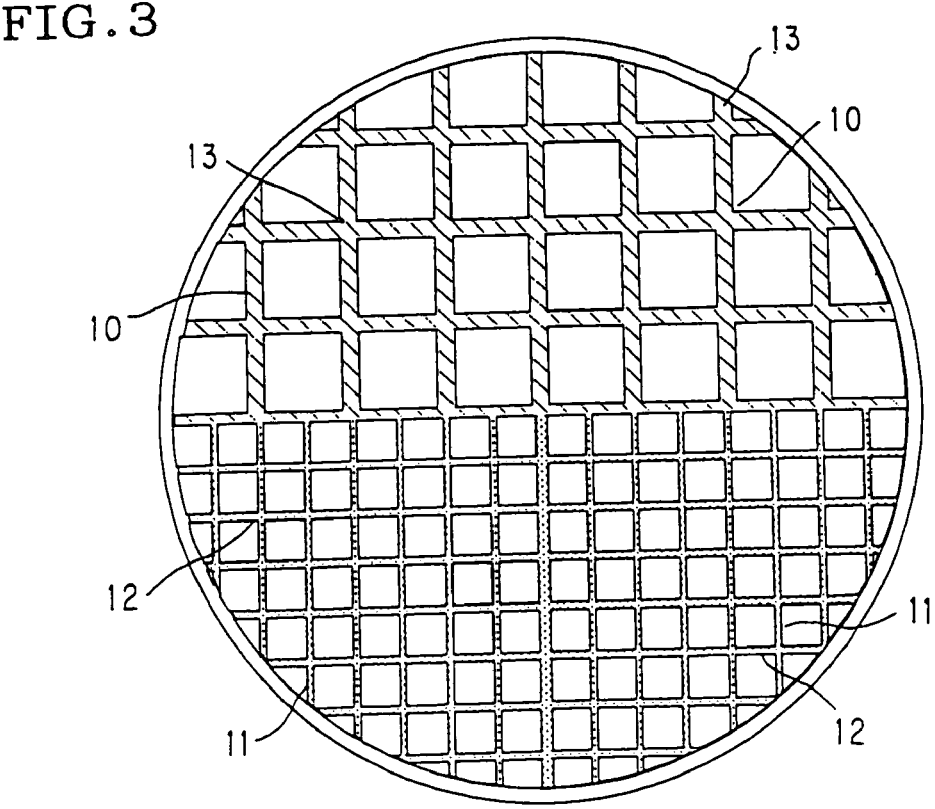
FIG. 3 is a plan view schematically showing another example of the arrangement relation between the plurality of honeycomb sections formed of the materials having different characteristics and those having different cell structures in the honeycomb structural body of the present invention.

Furthermore, in the present invention, as shown in FIGS. 2 and 3, for honeycomb sections 12, 13, at least one of cell structures such as cell density, partition wall thickness and sectional shape of a diametric direction in the through channel 3 may be varied in accordance with the demanded performances.

For example, in the honeycomb section (not shown) for use as the catalytic body or adsorbent, it is preferable to set the cell density to 0.465 to 3.101 cells/mm$^2$ (300 to 2000 cells/square inch), the partition wall thickness to 25 to 300 µm, and the sectional shape of the diametric direction in the through channel 3 to a triangular shape, quadrangular shape, hexagonal shape, or circular shape. It is more preferable to set the cell density to 0.930 to 3.101 cells/mm$^2$ (600 to 2000 cells/square inch) and the partition wall thickness to 25 to 100 µm.

Moreover, for example, in the honeycomb section (not shown) for use as the filter, it is preferable to set the cell density to 0.155 to 0.620 cell/mm$^2$ (100 to 400 cells/square inch), the partition wall thickness to 100 to 500 µm, and the sectional shape of the diametric direction in the through channel 3 to the triangular shape, quadrangular shape, or hexagonal shape. It is more preferable to set the cell density to 0.236 to 0.465 cell/mm$^2$ (150 to 300 cells/square inch), the partition wall thickness to 200 to 300 µm, and the sectional shape of the diametric direction in the through channel 3 to the quadrangular shape.

Furthermore, even with the honeycomb section which imparts any performance, in consideration of the lightening and strength of the honeycomb structural body 1, it is preferable to set the cell density to 0.155 to 3.101 cells/mm² (100 to 2000 cells/square inch), and the partition wall thickness to 25 to 500 µm. It is more preferable to set the cell density to 0.236 to 3.101 cells/mm² (150 to 2000 cells/square inch) and the partition wall thickness to 25 to 300 µm. The examples of the sectional shape of the diametric direction in the through channel 3 can include the triangular shape, quadrangular shape, hexagonal shape, elliptical shape, circular shape, and the like.

As shown in FIG. 2, in the present invention, the plurality of honeycomb sections 12, 13 including different cell structures do not have to be necessarily disposed in accordance with the plurality of honeycomb sections 10, 11 formed of the materials having the different characteristics, and the plurality of honeycomb sections 10, 11 including the different cell structures may also be disposed in portions different from those of the plurality of honeycomb sections 12, 13 formed of the materials having different characteristics.

However, to fulfill a high performance demanded in each honeycomb section, as shown in FIG. 3, the plurality of honeycomb sections 12, 13 including the different cell structures are preferably disposed substantially in accordance with the plurality of honeycomb sections 10, 11 formed of the materials having the above-described different characteristics.

Concretely, a difference between a boundary of the respective honeycomb sections 10, 11 formed of the materials having the different characteristics and that of the respective honeycomb sections 12, 13 in which the different cell structures are disposed is preferably 10 cells or less, more preferably 7 cells or less, further preferably 5 cells or less, especially preferably 3 cells or less.

In the honeycomb structural body 1 of the present invention, positions where the plurality of honeycomb sections 10, 11 formed of the materials having the different characteristics are to be disposed are not especially limited, and the sections may appropriately be disposed in appropriate positions in accordance with desired design, performance, and the like.

For example, as shown in FIG. 1, the plurality of honeycomb sections 10, 11 formed of the materials having the different characteristics are constituted of a first honeycomb section 11 (formed of one material having different characteristics) disposed in a middle region including a central axis of the honeycomb structural body 1, and a second honeycomb section 10 (formed of another material having the different characteristics) disposed in an outer peripheral region which surrounds the middle region and which is disposed adjacent to the middle region.

Figure 4:
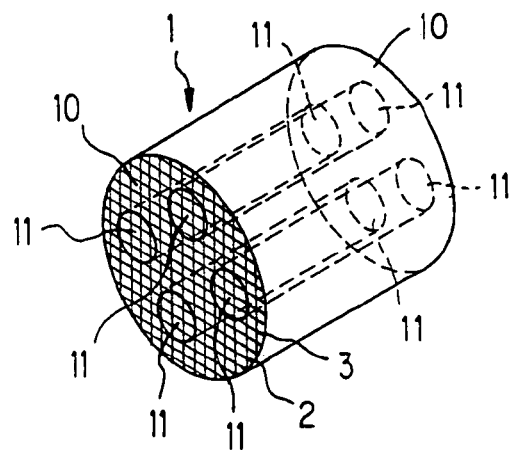
FIG. 4 is a perspective view schematically showing another embodiment in the honeycomb structural body of the present invention.

Moreover, as shown in FIG. 4, the plurality of honeycomb sections 10, 11 formed of the materials having the different characteristics may be constituted of first honeycomb sections 11 (formed of one material having different characteristics) disposed in a region including a plurality of cylindrical shapes positioned in parallel with the central axis of the honeycomb structural body 1 at a substantially equal interval, and a second honeycomb section 10 (formed of the other material having the different characteristics) disposed in the outer peripheral region which surrounds the region including the plurality of cylindrical shapes and which is disposed adjacent to the middle region.

Figure 5:
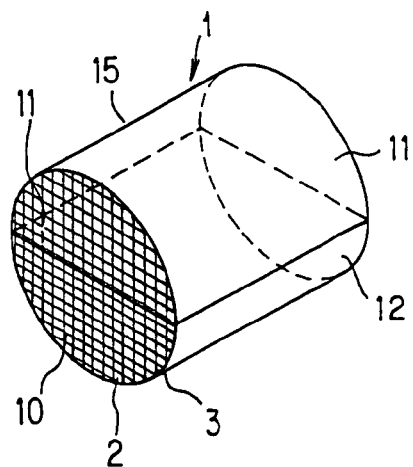
FIG. 5 is a perspective view schematically showing still another embodiment in the honeycomb structural body of the present invention.
Figure 6:
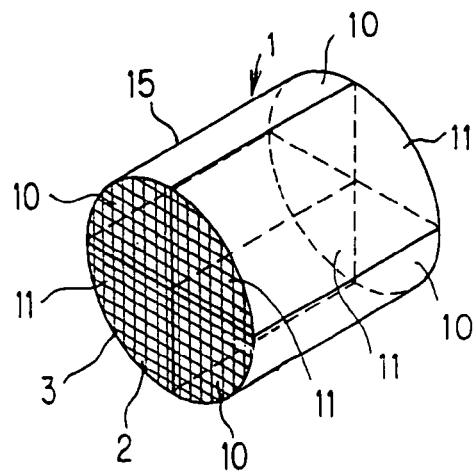
FIG. 6 is a perspective view schematically showing still another embodiment in the honeycomb structural body of the present invention.

Furthermore, as shown in FIG. 5, the honeycomb structural body 1 is divided into two in an axial direction, and is constituted of the first honeycomb section 11 (formed of one material having the different characteristics) disposed in one region and the second honeycomb section 10 (formed of the other material having the different characteristics) disposed in the other region; and as shown in FIG. 6, the honeycomb structural body 1 is divided into four in the axial direction, and is constituted of the first honeycomb sections 11 (formed of one material having the different characteristics) and the second honeycomb sections 10 (formed of the other material having the different characteristics) which are disposed in a pair of diagonally positioned regions, respectively.

As shown in FIGS. 1, 4 to 6, for the honeycomb structural body 1 of the present invention, the above-described plurality of honeycomb sections 10, 11 are directly bonded to and integrated with each other.

Accordingly, for example, when the respective honeycomb sections 10, 11 are formed of a main crystal of the same quality, stress concentrated on a bonded portion can be reduced, and resistance to shock, resistance to thermal shock, and the like can be enhanced. It is not necessary to adjust dimensions of separately manufactured sections or to bond the sections to one another, and manufacturing steps can be simplified. Furthermore, since a bonded portion is not required, an effective sectional area of the honeycomb structural body 1 can be increased.

It is to be noted that a method of directly bonding the plurality of honeycomb sections 10, 11 to each other to integrate the sections will be described later in a manufacturing method of the present invention.

In the honeycomb structural body 1 in the present invention, various additional materials are preferably disposed in the above-described honeycomb sections 10, 11 in accordance with the desired performance.

For example, to impart the performance of a catalyst carrier, the partition walls 2 of the honeycomb sections 10, 11 to which the performance is to be imparted preferably carry metals having catalytic capabilities, and in this case, the examples of the metals having the catalytic capabilities can include Pt, Pd, Rh, and the like.

Similarly, to impart the performance of the adsorbent of hydrocarbon, and the like, an adsorption layer for adsorbing hydrocarbon, and the like is preferably disposed in the partition walls 2 of the honeycomb sections 10, 11 to which the performance is to be imparted. In this case, the examples of the adsorption layer include layers formed of zeolite, activated carbon, and the like, and above all, the layer formed of zeolite is preferable in respect of heat resistance. Moreover, as zeolite, either natural materials or synthetic compounds may be used, and an Si/Al molar ratio is preferably 40 or more, and, for example, ZSM-5, USY, β-zeolite, mordenite, silicalite, metallosilicate, and the like can preferably be used. It is to be noted that two or more types of zeolite are preferably used to adsorb hydrocarbon, and the like having various molecular sizes.

Furthermore, to impart the performance of the filter, the partition walls 2 of the honeycomb sections 10, 11 to which the performance is to be imparted are formed of the materials having the above-described characteristics to have the filter capabilities. For the through channels 3 formed by the partition walls 2 having the filter capabilities, in the opposite ends through which the through channels 3 extend, the predetermined through channels 3 are plugged at one end, and the remaining through channels 3 are preferably plugged at the other end. Accordingly, the section can be used as the filter for trapping and removing particulate materials included in a dust-containing fluid.

It is to be noted that the performances of the respective honeycomb sections 10, 11 in the present invention are not limited to these, and needless to say, various performances may be imparted in accordance with the use.

Next, as shown in FIGS. 7 to 12, in the honeycomb structural body 1 of the present invention, a convex structure 6 or concave structure 8 is preferably disposed in at least one end 4 through which the through channels 3 extend.

By this structure, a canning structural body can be obtained in which an exhaust tube described later is attached to the convex structure 6 or the concave structure 8. Therefore, by the use for a long time, fluids such as the exhaust gas can be passed through the specific honeycomb sections 10, 11 of the honeycomb structural body 1 without leaking to a path other than a desired path, and high purification performances can be fulfilled.

In the present invention, the convex structure 6 or the concave structure 8 is disposed in at least one end 4 through which the through channels 3 extend, and may also be disposed in the opposite ends 4, 5 if necessary.

Moreover, in the present invention, a position where the convex structure 6 or the concave structure 8 is disposed is not especially limited, but from a viewpoint of connection of a channel, it is preferable to dispose the convex structure 6 in a middle portion or to dispose the concave structure 8 in the middle portion.

Figure 7:
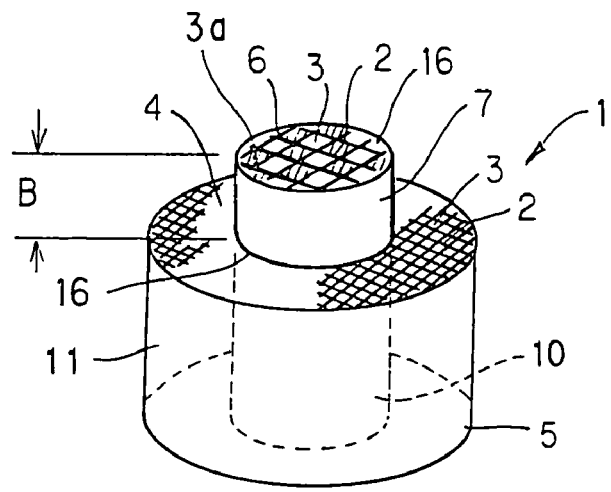
FIG. 7 is a perspective view schematically showing still another embodiment in the honeycomb structural body of the present invention.
Figure 8:
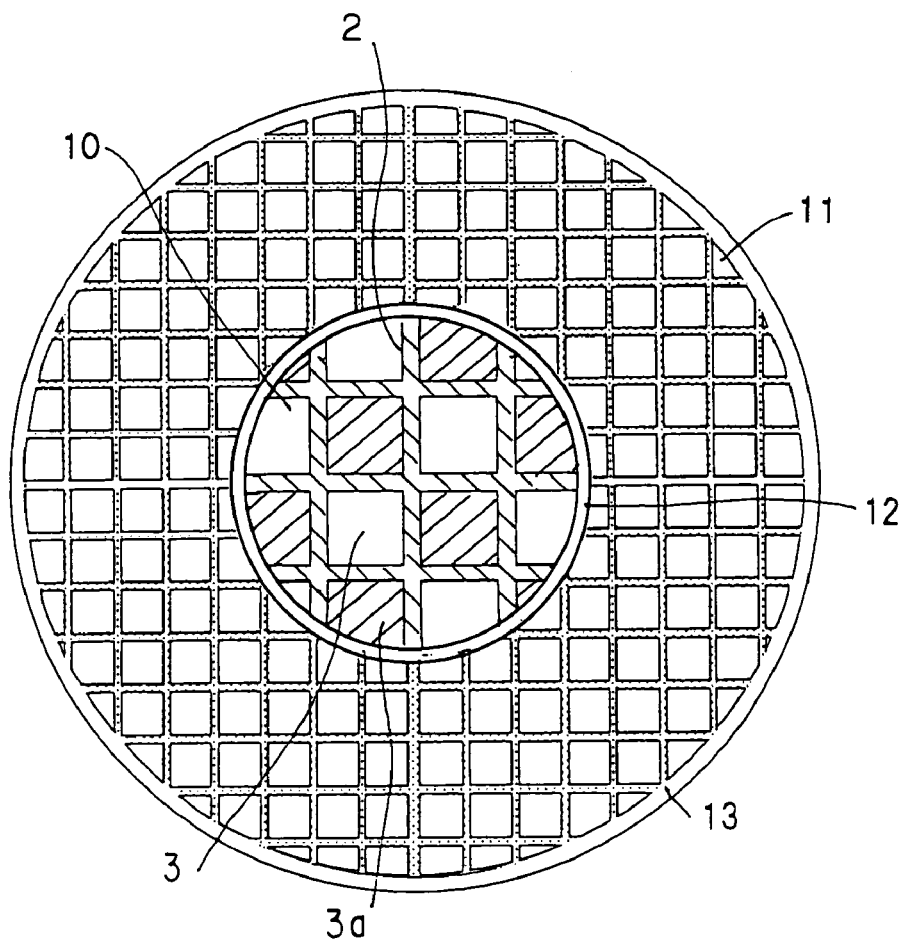
FIG. 8 is a top view of FIG. 7.
Figure 9:
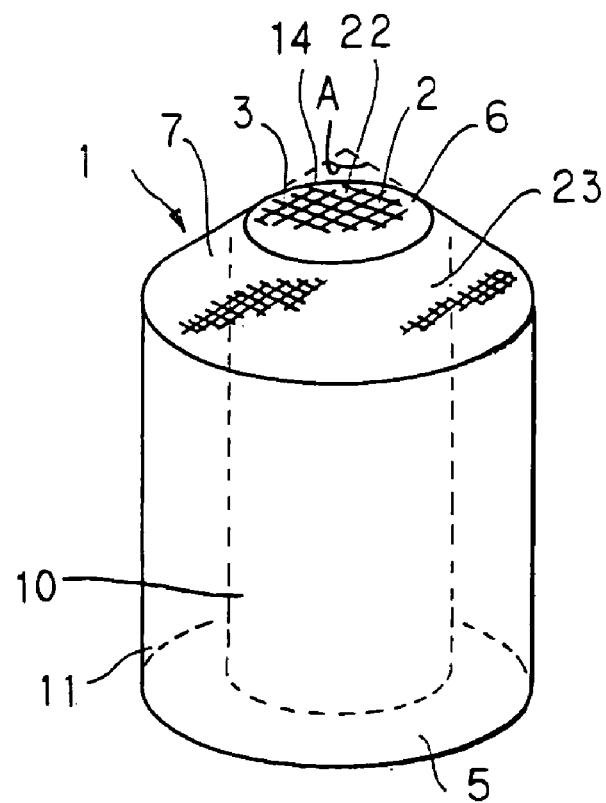
FIG. 9 is a perspective view schematically showing still another embodiment in the honeycomb structural body of the present invention.
Figure 10:
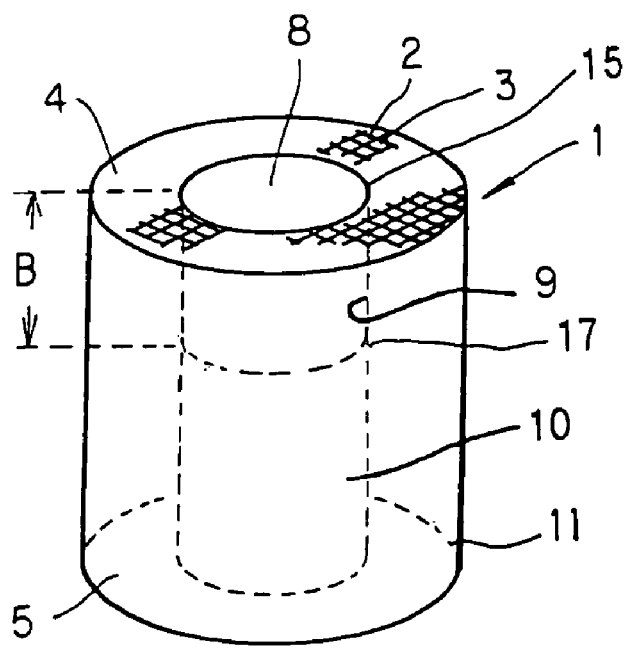
FIG. 10 is a perspective view schematically showing still another embodiment in the honeycomb structural body of the present invention.
Figure 11:
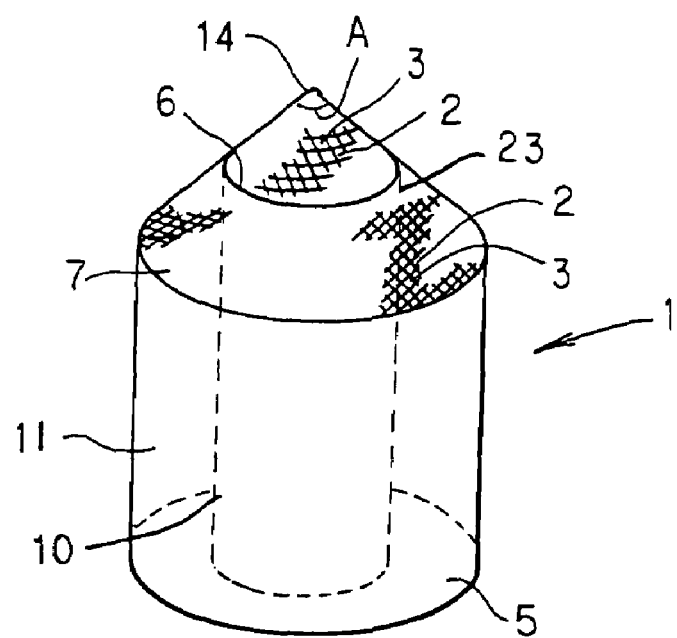
FIG. 11 is a perspective view schematically showing still another embodiment in the honeycomb structural body of the present invention.
Figure 12:
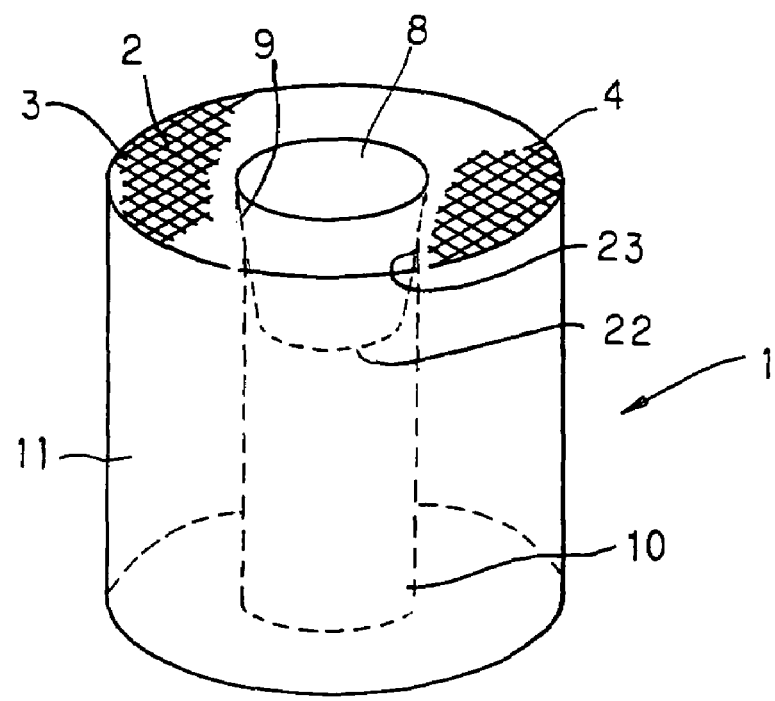
FIG. 12 is a perspective view schematically showing still another embodiment in the honeycomb structural body of the present invention.

As shown in FIG. 7 or 10, the convex structure 6 or the concave structure 8 in the present invention may have a sectional shape (e.g., a columnar shape, prismatic shape) of the honeycomb structural body 1 in a diametric direction, which is the same in an axial direction, or as shown in FIG. 9, 11, or 12, an outer peripheral side surface 7 of the convex structure 6 or an inner peripheral side surface 9 of the concave structure 8 may also have a slope tapered shape.

Moreover, as shown in FIG. 9, to dispose the convex structure 6 which has the tapered shape, a planar portion 22 is preferably disposed in a tip end 14 of the convex structure 6 in that the tip end 14 of the convex structure 6 at the time of handling can be prevented from being damaged. As shown in FIG. 12, when the concave structure 8 having the tapered shape is disposed, the planar portion 22 is preferably disposed in a bottom from a viewpoint of a valid volume of the honeycomb structural body 1. Moreover, as shown in FIG. 9, 11, or 12, in the convex structure 6 or the concave structure 8 which has the tapered shape, when a slope 23 of the convex structure 6 or concave structure 8 has a moderate inclination, and when the exhaust tube is disposed to abut on the specific honeycomb section 11, it becomes difficult to seal the fluid. Therefore, an angle A held by the slope 23 of the convex structure 6 or the concave structure 8 is set to an angle of preferably 150 degrees or less, more preferably 120 degrees or less.

Moreover, as shown in FIG. 11, when the convex structure 6 is constituted to have a triangular shape without disposing the planar portion in the tip end 14 of the convex structure 6, considering from the strength of the convex structure 6, the angle A of the tip end 14 held by the slope preferably has an angle of 60 degrees or more.

In the present invention, to dispose the convex or concave structure in the opposite ends through which the through channels extend, the convex or concave structure in which the sectional shape of the honeycomb structural body in the diametric direction is the same in the axial direction may also be disposed in the opposite ends. The convex or concave structure having the tapered shape may be disposed in one end through which the through channels extend, and the convex or concave structure in which the sectional shape of the honeycomb structural body in the diametric direction is the same in the axial direction may also be disposed in the other end through which the through channels extend (not shown). Needless to say, for the convex or concave structure, the sectional shape of the honeycomb structural body in the diametric direction may also have a shape other than the same shape in the axial direction.

In the present invention, as shown in FIG. 7, in the honeycomb structural body 1 including the convex structure 6 which forms a step, a step B of the end 4 has a size of preferably 2 mm or more, more preferably 5 mm or more. When the step B is in this range, the exhaust tube described later can easily be attached, and an attached state can securely be maintained even under vibration. On the other hand, the step B of the end 4 preferably has a size which is not more than a diameter in a root position 16 of the convex structure 6 so as to impart a sufficient strength to the convex structure 6.

Moreover, in the present invention, as shown in FIG. 10, for the honeycomb structural body 1 including the concave structure 8 forming the step, the step B of the end 4 has a size of preferably 2 mm or more, more preferably 5 mm or more from a viewpoint similar to that of the honeycomb structural body 1 including the convex structure 6 shown in FIG. 7. On the other hand, from the viewpoint of the valid volume of the honeycomb structural body 1, the size is preferably not more than an inner diameter in a bottom position 17 of the concave structure 8.

In the present invention, to prevent fluids such as the exhaust gas charged into the specific honeycomb section from leaking out of the desired path, the outer peripheral side surface 7 of the convex structure 6 or the inner peripheral side surface 9 of the concave structure 8 disposed in the end 4 through which the through channels 3 extend as shown in FIGS. 7, 10 may preferably be coated with a coat material.

In this case, as the coat material, a material having superior characteristics such as heat resistance and peel resistance is preferable. For example, major components are preferably a material constituting the honeycomb section to be coated, ceramic fiber, and colloidal oxide (colloidal silica, colloidal alumina, and the like).

In the present invention, the respective honeycomb sections 10, 11 do not have to be necessarily disposed in accordance with the convex structure 6 or the concave structure 8 disposed in the end 4 through which the through channels 3 extend. However, with the convex structure 6 or the concave structure 8 in which the sectional shape of the diametric direction is the same in the axial direction as shown in FIG. 7 or 10, the honeycomb sections 10, 11 are preferably disposed in accordance with the convex structure 6 or the concave structure 8 in that an appropriate fluid channel is constructed in accordance with the performances of the respective honeycomb sections 10, 11.

On the other hand, when the convex structure 6 or the concave structure 8 having the tapered shape is disposed as shown in FIG. 9, 11, or 12, the honeycomb sections 10, 11 are preferably disposed via a boundary in any position of the slope 23 of the tapered shape (concrete position of any slope 23 may arbitrarily be determined by designs) in that the appropriate fluid channel is constructed in accordance with the performances of the respective honeycomb sections 10, 11 and in that a seal property at the time of abutment on the exhaust tube is enhanced.

It is to be noted that in the honeycomb structural body 1 of the present invention, the shape of the structural body is not especially limited, and in accordance with the designs, polygonal shapes such as a triangular shape, a rectangular shape, square shape, rhomboidal shape, trapezoidal shape, and shapes such as elliptical shape, circular shape, race track shape, semi-elliptical shape and semicircular shape.

Next, the canning structural body of the present invention including this honeycomb structural body will be described.

Figure 13:
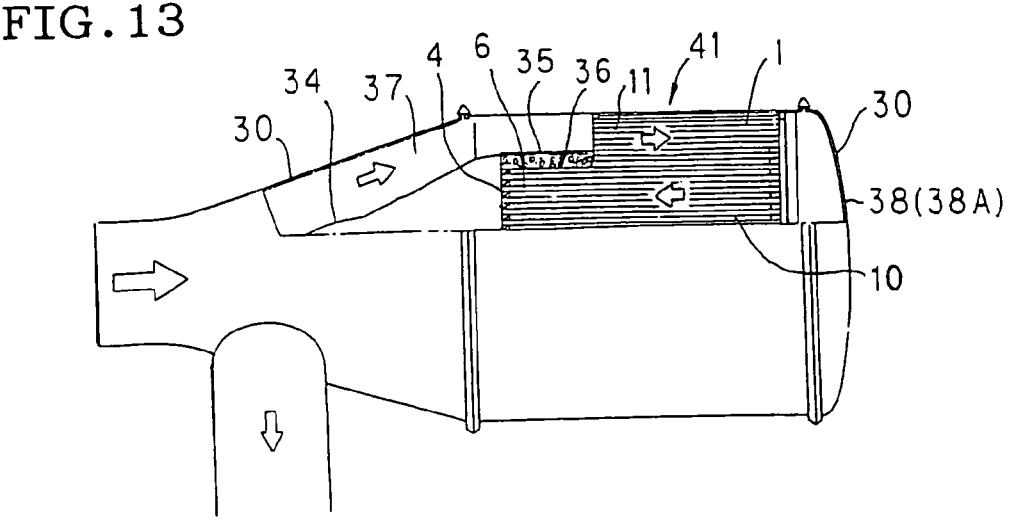
FIG. 13 is a semi-sectional view schematically showing one embodiment in a canning structural body of the present invention.
Figure 14:
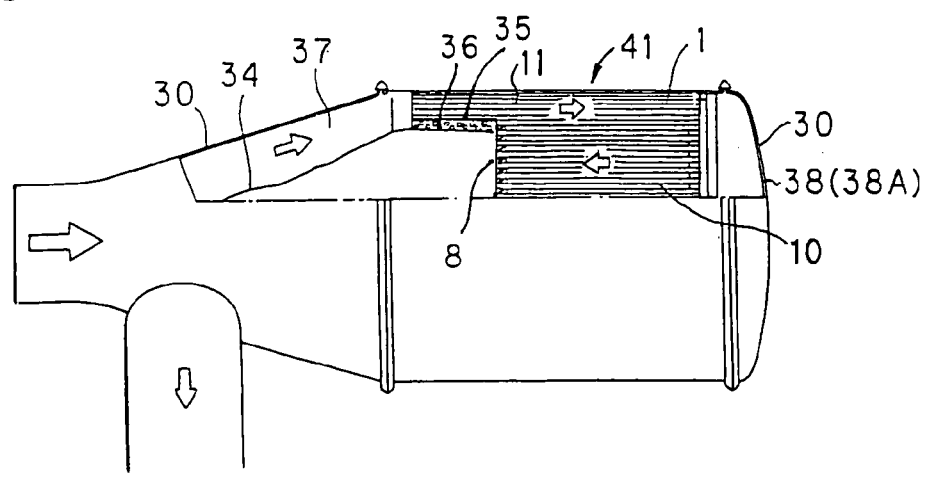
FIG. 14 is a semi-sectional view schematically showing another embodiment in the canning structural body of the present invention.
Figure 15:
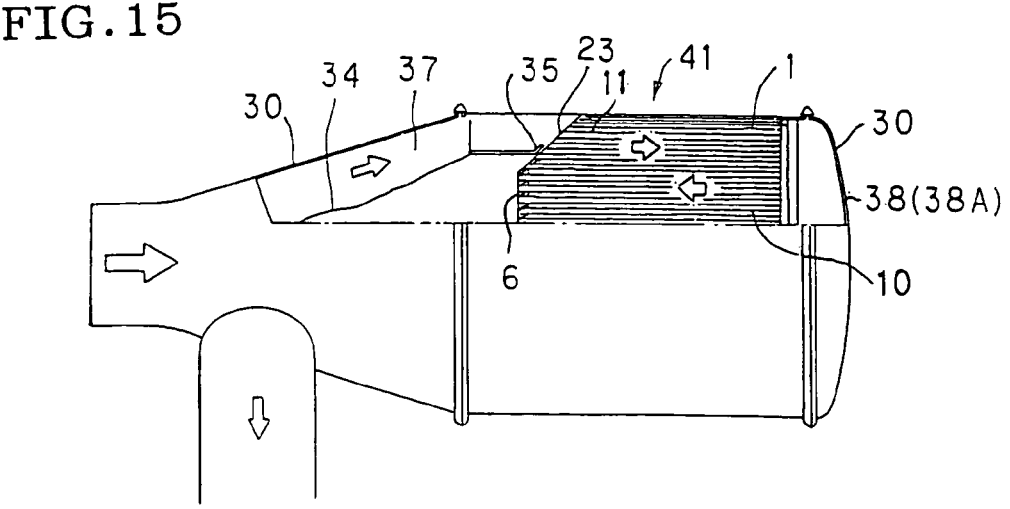
FIG. 15 is a semi-sectional view schematically showing still another embodiment in the canning structural body of the present invention.

As shown in FIGS. 13 to 15, a canning structural body 41 of the present invention comprises: the honeycomb structural body 1 in which the plurality of through channels 3 are formed by the plurality of partition walls in the axial direction; and a case 30 in which the honeycomb structural body 1 is held and which includes an exhaust tube 34 disposed for the honeycomb section 11 constituting a part of the honeycomb structural body 1. For the honeycomb structural body 1, the convex structure 6 or the concave structure 8 is disposed in at least one end 4 through which the through channels 3 extend, and the exhaust tube 34 is attached to the convex structure 6 or the concave structure 8.

By this structure, even with the use for a long time, the fluids such as the exhaust gas can be charged into the specific honeycomb sections 10, 11 of the honeycomb structural body 1 without leaking to the path other than the desired path, and the high purification performances can be fulfilled.

Here, for the canning structural body 41 of the present invention, the fluid is charged into specific one honeycomb section 11 via a fluid introductory path 37 formed by an outer wall of the exhaust tube 34 and an inner wall of a main body of case 30. After the fluid is further charged into the specific honeycomb section 10 by a channel change member 38, and the like described later, the fluid subjected to purification, heat exchange, and the like is discharged via the exhaust tube 34 which abuts on the specific other honeycomb section 10.

As shown in FIG. 15, in the canning structural body 41 in the present invention, the exhaust tube 34 may directly be attached to the convex structure 6 or the concave structure (not shown) of the honeycomb structural body 1. In this case, to completely prevent the fluid from leaking, an end 35 of the exhaust tube 34 is urged using an elastic force, and is preferably pressed onto the outer peripheral side surface 7 of the convex structure 6 or the inner peripheral side surface of the concave structure.

Moreover, as shown in FIGS. 13 and 14, the exhaust tube 34 is also preferably attached to the convex structure 6 or the concave structure 8 via a holding material 36 in that the fluid can more completely be prevented from leaking and that the honeycomb structural body 1 can be prevented from being damaged by friction between the exhaust tube 34 and the honeycomb structural body 1. In this case, as the holding material 36, for example, a ceramic mat formed of alumina, mullite, and the like, or a metal mesh formed of stainless steel, and the like can be used.

Furthermore, as shown in FIG. 15, when the convex structure 6 or the concave structure (not shown) disposed in the honeycomb structural body 1 has the tapered shape, the end 35 of the exhaust tube 34 preferably has a spreading or narrowing shape substantially extending along a slop surface of the convex structure 6 or the concave structure having the tapered shape.

Accordingly, a contact area of the slope surface with the end 35 of the exhaust tube 34 increases, and the seal property of the fluid can be enhanced with a simple structure which can be prepared at the low cost.

As shown in FIGS. 13 to 16, in the canning structural body 41 of the present invention, the case 30 preferably includes the channel change member 38 for changing the channel of the fluid which has flown out of one honeycomb section 11 to charge the fluid into the other honeycomb section 10.

Figure 16:
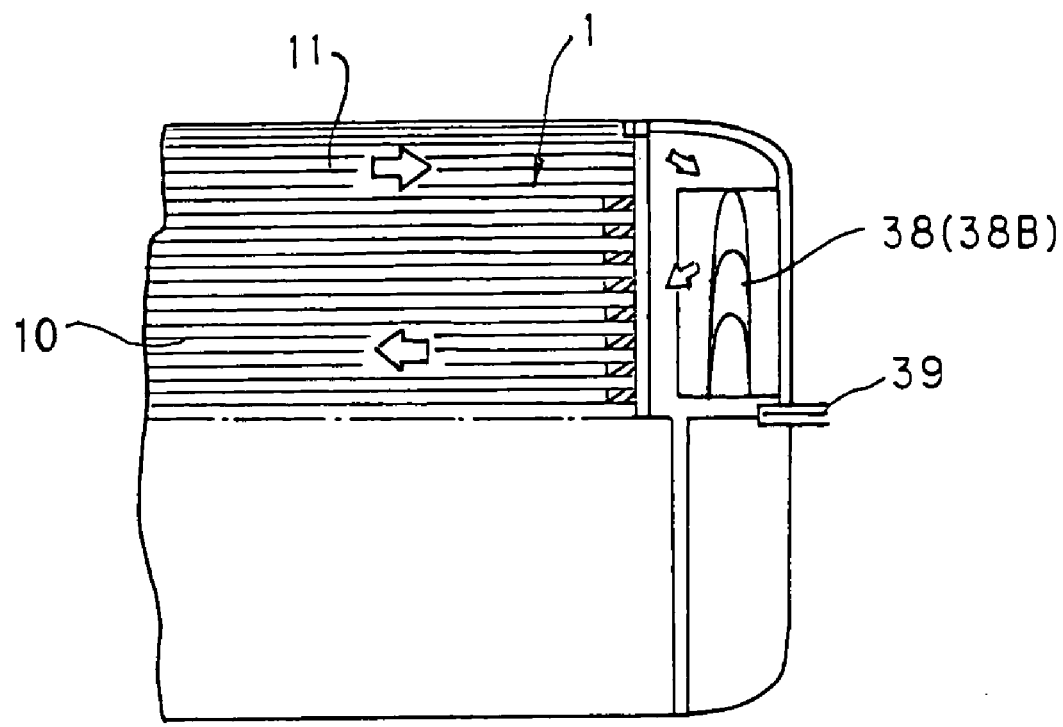
FIG. 16 is a partially semi-sectional view schematically showing still another embodiment in the canning structural body of the present invention.

In this case, as the channel change member 38, a plate-like member 38A constituting a barrier against the flow of the fluid as shown in FIGS. 13 to 15, or a rotary wing member 38B which rotates using the flow of the fluid to give a spiral flow as shown in FIG. 16 can be used.

The channel of the fluid can be changed with a simple structure in the former channel change member 38A. For the latter channel change member 38B, when reducing agents such as urea are added into the fluids such as the exhaust gas, the obtained spiral flow is used to mix the fluids such as the exhaust gas with the added material, and flow rates of the fluids different in a flow rate distribution can be uniformed. It is to be noted that as the former channel change member 38A, as shown in FIGS. 13 to 15, the inner wall of the case 30 may be formed in a desired shape such as a curved surface to also perform the function of the channel change member 38A, or a separate channel change member (not shown) may also be disposed in the case.

Moreover, in the canning structural body 41 of the present invention, in accordance with the application, needless to say, a constitution may also be used in which the exhaust gas is first charged into one honeycomb section 10 and thereafter charged into the other honeycomb section 11.

It is to be noted that the honeycomb structural body 1 constituting the canning structural body of the present invention has been described above, and the description thereof is omitted here.

Next, a method of manufacturing the honeycomb structural body of the present invention will be described.

In the method of manufacturing the honeycomb structural body of the present invention, a raw material containing a ceramic material which is a major component is used, and the material formed of a plurality of materials different in the characteristics after fired is used. The plurality of materials are kneaded with a medium by different kneading mechanisms to obtain a plurality of puddles. After guiding the plurality of puddles into different positions of a die, the plurality of puddles are simultaneously extruded.

In accordance with the manufacturing method of the present invention, the honeycomb structural body of the present invention in which the respective honeycomb sections having different characteristics after fired are directly bonded and integrated can be manufactured by simple and secure steps at low cost. This will hereinafter be described concretely.

First in the manufacturing method of the present invention, as the raw material containing the ceramic material which is the major component, a plurality of raw materials having different characteristics after fired are used.

For example, the raw material containing the ceramic material which is the major component contains at least one selected as the major component from a group consisting of metal silicon, silicon carbide, titanium, zirconium, boron carbide, titanium carbide, zirconium carbide, silicon nitride, boron nitride, aluminum nitride, aluminum oxide, zirconium oxide, mullite, cordierite forming raw material, aluminum titanate, sialon, kaolin, talc, aluminum hydroxide, fused silica, and quartz. The major component may appropriately be selected in accordance with the demanded characteristics after sintered. When the other materials such as the crystal growth auxiliary agent, and pore forming material are further contained as the additives, the raw material may also be used so as to meet the demanded characteristics after sintered. Needless to say, dispersant, binder, and the like may be further contained as the additives.

The examples of the characteristics after fired of the raw material containing the ceramic material which is the major component include the porosity, average pore diameter, water absorption, specific heat, and the like, and it is preferable in the present invention to use the raw material which differs with at least one of these characteristics.

A desired range in these characteristics is similar to that described in the honeycomb structural body of the present invention, and the raw material is preferably prepared so as to obtain the characteristics after sintered.

It is to be noted that as the raw material of the portion for use as the catalytic body, adsorbent, or filter, the material containing cordierite, SiC, and the llike which is the major component can be used.

In the manufacturing method of the present invention, next, the materials having the different characteristics after fired are kneaded with the mediums by different kneading mechanisms to obtain a plurality of puddles.

In the present invention, the kneading mechanism is not especially limited, and, for example, a vacuum pug millpug mill may also be used to knead the materials, but a screw type extrusion mechanism described later is preferably used to continuously a kneading step and extruding step in a series of steps in respect of enhancement of productivity.

Moreover, in the present invention, the medium is not especially limited, and an appropriate medium may preferably be used in accordance with the raw materials described above.

In the manufacturing method of the present invention, next, after the plurality of resulting puddles having the different characteristics after fired are charged into the different positions of the die, the plurality of puddles are simultaneously extruded to mold the structural body.

Figure 17:
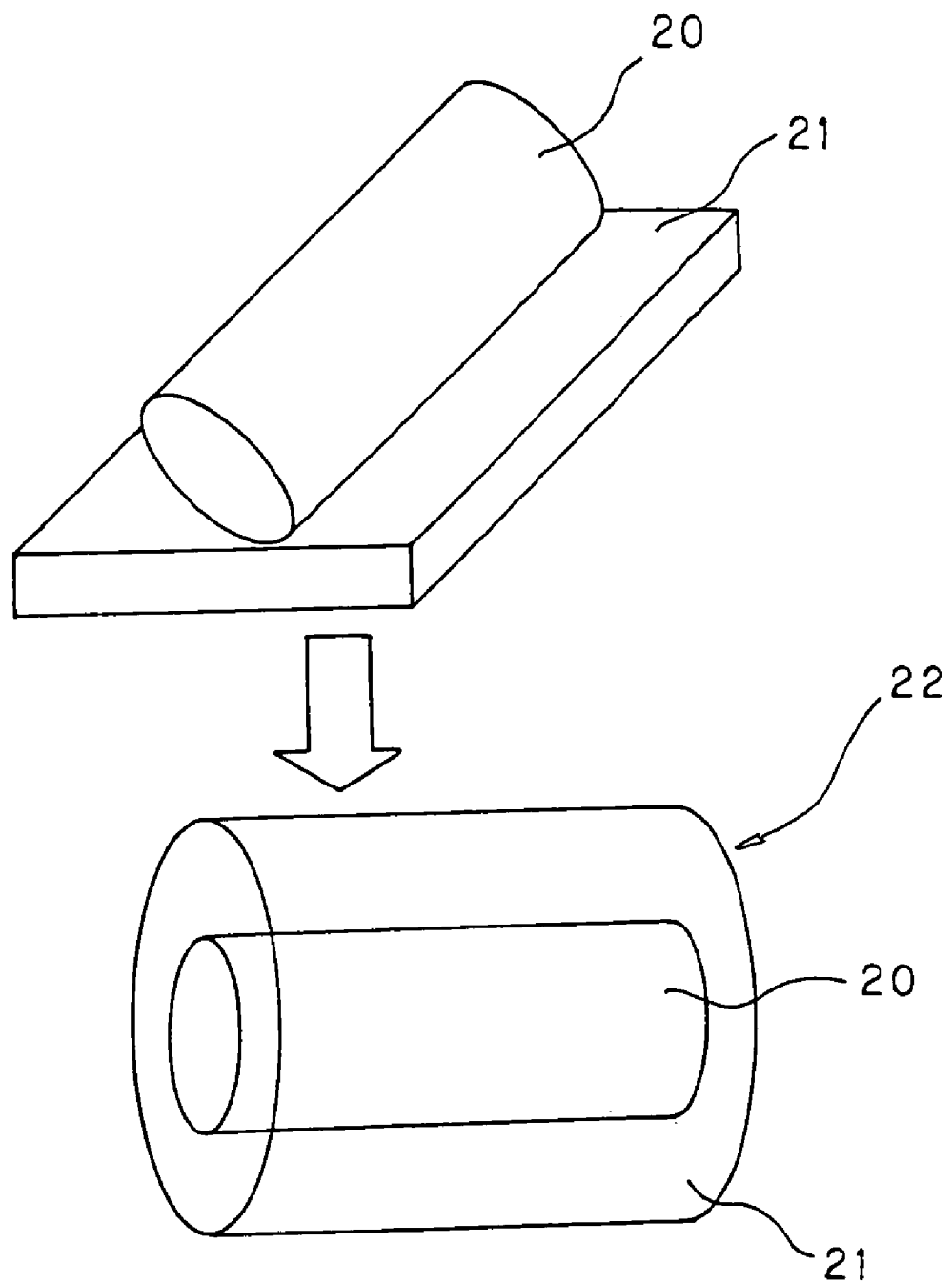
FIG. 17 is a step diagram schematically showing one example of a method of preparing composite puddle in a method of manufacturing the honeycomb structural body of the present invention.

As means for guiding the plurality of resulting puddles having the different characteristics after fired into the different positions of the die and subsequently extruding the puddles, there can be used a method of preparing composite puddle in which the plurality of puddles having the different characteristics after fired are integrated, and extrusion molding the composite puddle. In this case, for the composite puddle, for example, as shown in FIG. 17, around one puddle 20 formed of one material, at least one or more other puddles 21 whose characteristics after fired are different from those of the one puddle 20 are disposed and integrated and the composite puddle can be obtained. For such composite puddle 22, the honeycomb structural body can be easily obtained in which the honeycomb sections formed of the material having the different characteristics are directly bonded with one syringe type extrusion mechanism.

It is to be noted that to dispose the first honeycomb section in the above-described middle region and the second honeycomb section in the outer peripheral region in a position where the central axis of the honeycomb structural body is substantially concentric, the one puddle 20 formed of one material and the other puddle 21 disposed in the periphery may be disposed in a substantially concentric position.

Moreover, in the present invention, since the honeycomb structural body is manufactured by extrusion molding, for the above-described composite puddle 22, the respective puddles 20, 21 formed of the materials having the different characteristics after fired are preferably stacked in a direction vertical to an extruding direction. Furthermore, in order to enhance moldability at the time of the extrusion molding, a gap between the plurality of puddles 20, 21 having different characteristics after fired is reduced, and the puddles are preferably closely bonded.

As another means for guiding the plurality of resulting puddles formed of the material having the obtained different characteristics into the different positions of the die to simultaneously extrude the puddles, a method of guiding a plurality of puddles having the different characteristics after fired into the different positions of the die by the different extrusion mechanisms to simultaneously extrude the puddles can be used.

Figure 18A:
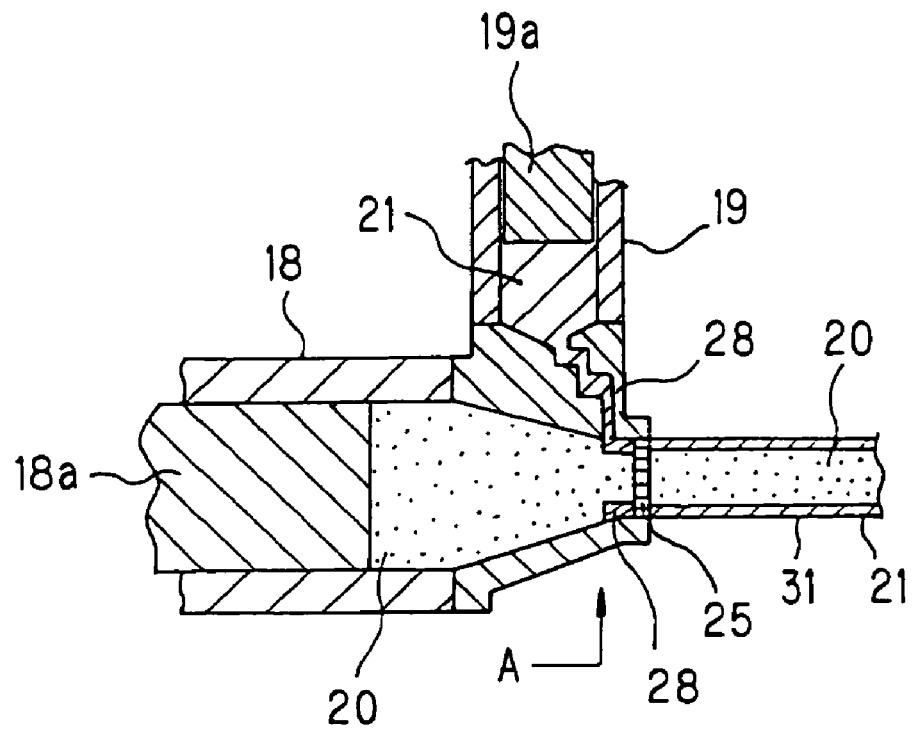
FIG. 18(a) is a partially sectional view schematically showing one example of an extrusion mechanism for use in the method of manufacturing the honeycomb structural body of the present invention.
Figure 18B:
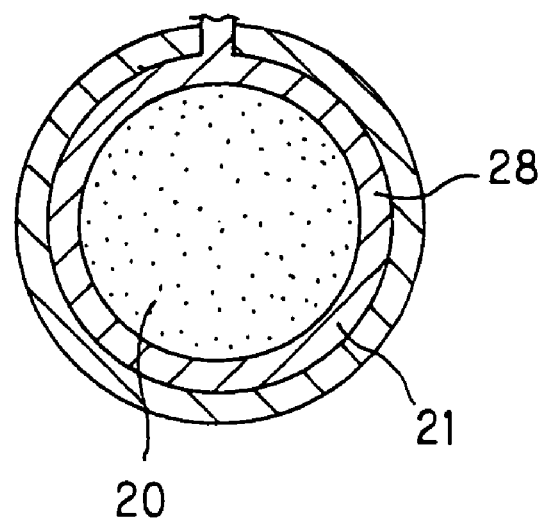
FIG. 18(b) is a partially sectional view in a position A showing arrangement of a guide portion of FIG. 18(a)
Figure 19A:
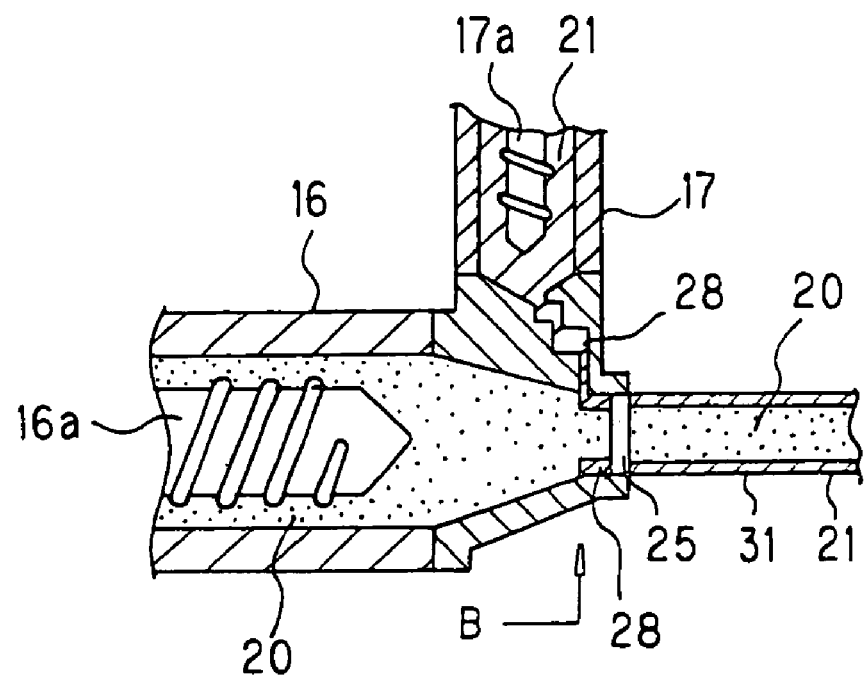
FIG. 19(a) is a partially sectional view schematically showing another example of the extrusion mechanism for use in the method of manufacturing the honeycomb structural body of the present invention.
Figure 19B:
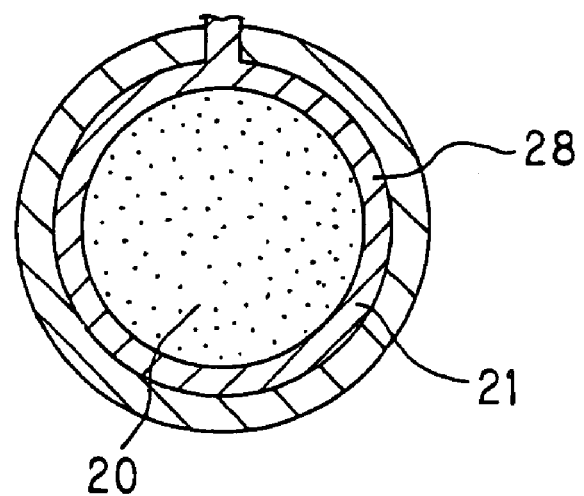
FIG. 19(b) is a partially sectional view in a position B showing the arrangement of the guide portion of FIG. 19(a)

Concretely, there can be exemplified: a method of using a plurality of syringe type extrusion mechanisms 18, 19 as the extrusion mechanisms as shown in FIGS. 18(a)(b) to put the plurality of puddles 20, 21 having the different characteristics after fired into the respective syringe type extrusion mechanisms 18, 19 and synchronizing/performing extruding steps in the respective extrusion mechanisms 18, 19 to simultaneously extrude the respective puddles 20, 21; or a method of using a plurality of screw type extrusion mechanisms 16, 17 as the extrusion mechanisms as shown in FIGS. 19(a)(b) and synchronizing/performing steps of kneading the raw materials with the mediums and steps of extruding the puddles obtained by the kneading in the respective extrusion mechanisms 16, 17 to simultaneously extrude the respective puddles 20, 21.

Above all, when the kneading of the raw material with the medium and the extrusion of the puddles obtained by the kneading can continuously be carried out, and the productivity can remarkably be enhanced. In this respect, the latter method of using the screw type extrusion mechanisms 16, 17 is preferable.

Figure 20A:
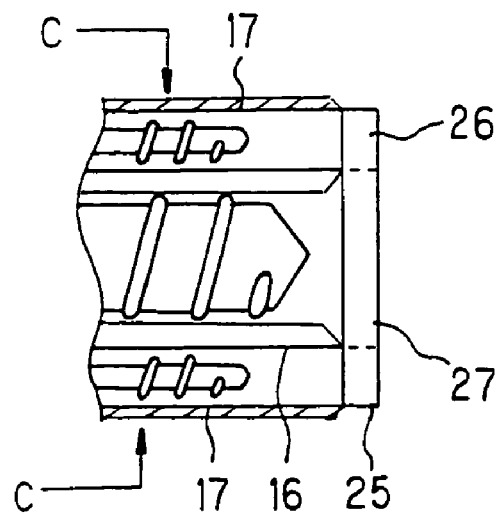
FIG. 20(a) is a partially sectional view schematically showing still another example of the extrusion mechanism for use in the method of manufacturing the honeycomb structural body of the present invention.
Figure 20B:
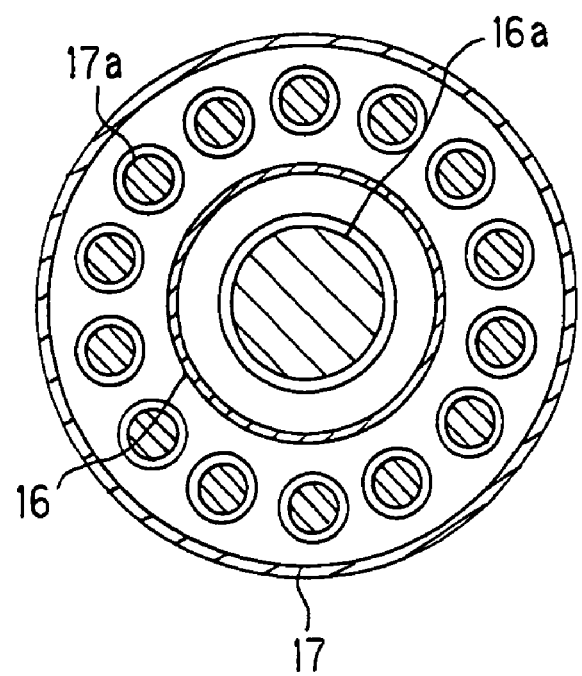
FIG. 20(b) is a partially sectional view in a position C showing the arrangement of the guide portion of FIG. 20(a)

Moreover, as an arrangement of the extrusion mechanisms, for example, as shown in FIGS. 20(a)(b), there can be exemplified an arrangement for disposing the respective extrusion mechanisms 16, 17 for each of the portions 26, 27 in a die 25 into which the respective puddles having the different characteristics after fired are to be charged. However, as shown in FIGS. 19(a)(b), in at least one extrusion mechanism 17, a guide portion 28 for connecting the extrusion mechanism 17 to the specific portion of the die 25 to charge the puddles into the specific portion of the die 25 is included, and the respective extrusion mechanisms 16, 17 are preferably freely arranged in accordance with the designs. It is to be noted that in the extrusion mechanism 17 including the guide portion 28, the design of the extrusion mechanism can remarkably be simplified.

In the present invention, the shape and structure of the die for use are not especially limited. However, for example, when a plurality of honeycomb sections different in the cell structures such as the cell density, partition wall thickness, and the sectional shape of the through channel in the diametric direction are disposed, at least one of a cell block pitch, slit width, and the sectional shape of the cell block in a direction vertical to the extruding direction is preferably varied in accordance with the demanded cell structure.

Moreover, when the plurality of honeycomb sections having different cell structures are disposed for those formed of the materials having the different characteristics, the cell structure is preferably varied with each portion into which the puddles having substantially different characteristics are to be charged.

Concretely, the difference between the boundary of the respective portions of the die into which the puddles having the different characteristics after fired are to be charged and that of the respective portions of the die having different shape and structure is preferably 10 cells or less, more preferably 7 cells or less, further preferably 5 cells or less, especially preferably 3 cells or less.

In the manufacturing method of the present invention, usually, an obtained molded body of the honeycomb structure is fired to obtain a final product, and preferably the molded body is usually dried by a microwave and/or hot air, and subsequently fired.

Moreover, as a method of forming the above-described convex structure 6 or the concave structure 8, for example, there can be exemplified: a method of allowing extruding timings to deviate with the body for the first honeycomb section having the columnar or prismatic shape and that for the second honeycomb section having the hollow cylindrical shape and varying lengths of the respective honeycomb sections in the axial direction; or a method of preparing the honeycomb structural body having the columnar or prismatic shape and next cutting the end through which the through channels extend after the molding or the calcining to form the convex or concave structure.

EXAMPLES

Examples of the present invention will hereinafter be described more concretely, but the present invention is not limited to these examples.

It is to be noted that the honeycomb structural bodies obtained in the examples and comparative examples were evaluated by the following methods.

(Evaluation Method)

1. Average Pore Diameter

The diameter was measured by a mercury press-in type porosimeter manufactured by Micro Meritic Co.

2. Porosity

The porosity was determined by calculation from a true specific gravity of the material constituting the honeycomb structural body and a total pore volume. Moreover, the pore volume was measured by the mercury penetration type porosimeter manufactured by Micro Meritic Co.

3. Water Absorption

The absorption was measured by a method described in JIS R2205.

4. Heat Vibration Test

After heating and vibrating the canning structural body of each of the examples and comparative examples under the following conditions, an attached state of the exhaust tube was visually observed.
(1) Canning structural body inlet gas temperature: The temperature was repeatedly changed at 900° C.×5 minutes to 100° C.×5 minutes which was one cycle.
(2) Vibration: The body was vibrated at 200 Hz, 30G in the direction vertical to a through direction of the through channel.
(3) Test time: The test was carried out for 20 hours.

Examples and Comparative Examples

Example 1

First, as ceramic raw materials, a first ceramic raw material and second ceramic raw material formed of cordierite materials having different characteristics after fired were prepared.

Next, the respective ceramic raw materials together with water used as the medium were fed into different vacuum pug millpug mills to knead and mold the respective ceramic raw materials with water, and puddle having a columnar shape with a diameter of 150 mm and formed of a first ceramic raw material, and puddle having a flat plate shape with a width of 475 mm and thickness of 40 mm and formed of a second ceramic raw material were obtained.

Next, the puddle having the flat plate shape and formed of the second ceramic raw material was wound around the puddle having the columnar shape and formed of the first ceramic raw material to prepare the integrated composite puddle.

Subsequently, the obtained columnar composite puddle was put into a ram type extruder in which the dies different in the cell structure were disposed in a middle portion having a diameter of 120 mm and an outer peripheral portion. The extrusion molding was carried out to prepare a molded body in which the first honeycomb section formed of the first ceramic raw material was disposed in the middle portion concentric with the honeycomb structural body and having a diameter of 120 mm and the second honeycomb section formed of the second ceramic raw material was disposed in the outer peripheral portion disposed adjacent to the middle portion.

Next, the obtained molded body was dried by the hot air and microwave, and subsequently the through channels of the first honeycomb section disposed in the middle portion were alternately plugged at the opposite ends through which the holes extend, and fired.

Next, the catalyst containing Pt as the major component was loaded on the partition walls of the honeycomb section formed of the second ceramic raw material to obtain the columnar honeycomb structural body having a length of 203 mm, diameter of 190 mm.

The characteristics of the obtained honeycomb structural body were checked. The honeycomb section formed of the first ceramic raw material had an average pore diameter of 30 µm, water absorption of 91%, porosity of 70%, partition wall thickness of 0.25 mm, and cell density of 0.465 cell/mm$^2$ (300 cells/square inch), and the sectional shape of the through channel in the diametric direction was quadrangular. The honeycomb section formed of the second ceramic raw material had an average pore diameter of 5 µm, water absorption of 17%, porosity of 30%, partition wall thickness of 0.1 mm, and cell density of 0.930 cell/mm$^2$ (600 cells/square inch), and the sectional shape of the through channel in the diametric direction was quadrangular.

Figure 21:
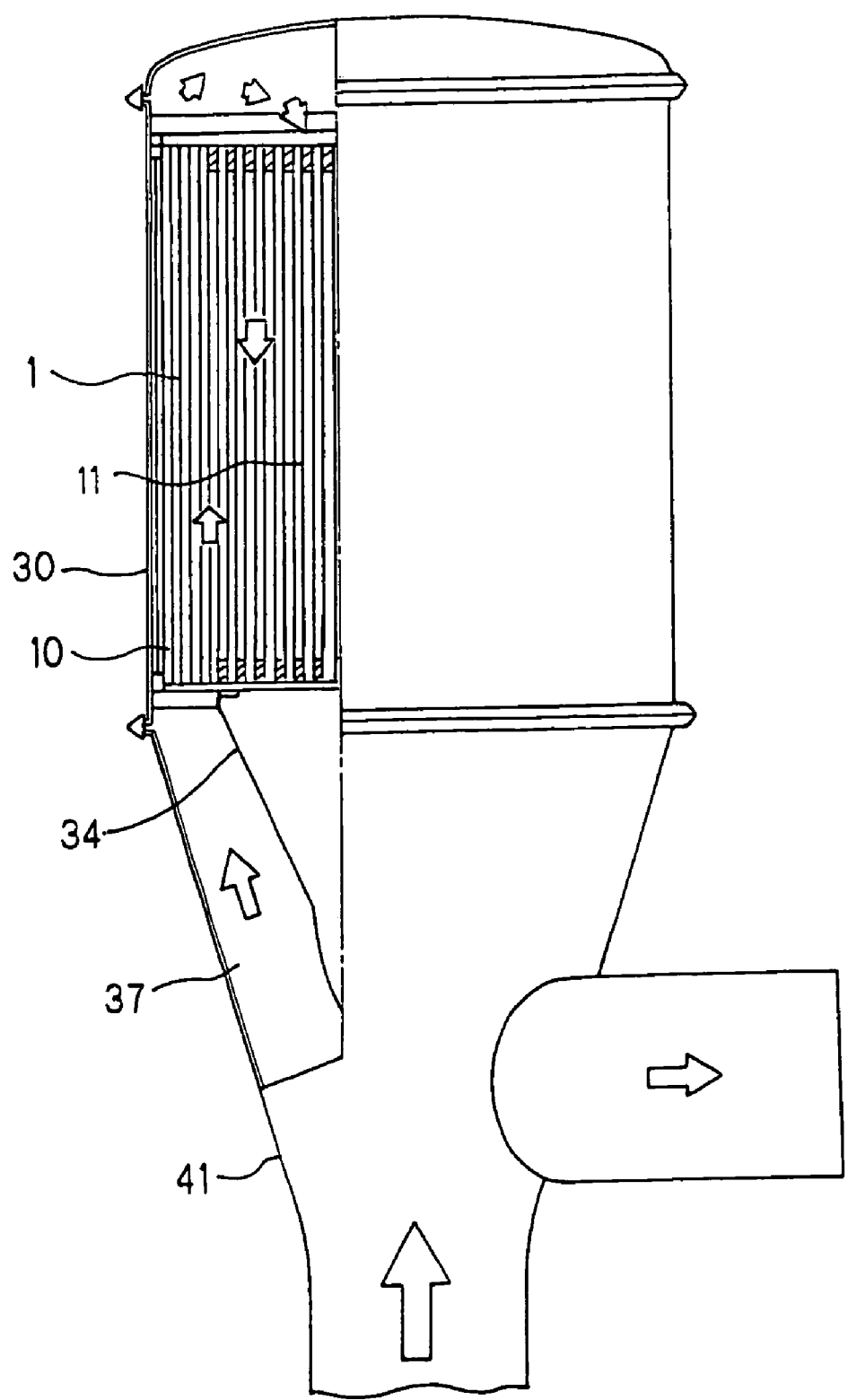
FIG. 21 is a semi-sectional view showing an exhaust gas purification apparatus in which the honeycomb structural body in examples of the present invention or comparative examples is attached to an exhaust tube of a diesel engine.

Moreover, as shown in FIG. 21, the honeycomb structural body 1 was held in the metal case 30, and the exhaust tube 34 of a 2400 cc diesel engine was disposed for the first honeycomb section 11 formed of the first ceramic raw material to prepare an exhaust gas purification apparatus.

The exhaust gas was charged via the exhaust gas introductory path 37 formed by the outer wall of the exhaust tube 34 and the inner wall of the metal case, passed through the second honeycomb section 10 formed of the second ceramic raw material to function as a catalytic body for converting NO to $NO_2$, and the first honeycomb section 11 formed of the first ceramic raw material to function as the filter for trapping and removing the particulate material in order, and purified. Then, superior exhaust gas purification performance was recognized. Moreover, the tested honeycomb structural body was checked for damage, deformation, and the like. Then, the damages such as peels and cracks, and the deformation of the through channel were not recognized at all in the structural body including the bonded portion of both the honeycomb sections. It is to be noted that arrows in FIG. 21 indicate a proceeding direction of the exhaust gas.

Example 2

First, as the ceramic raw materials, the first ceramic raw material and second ceramic raw material formed of silicon carbide materials having different characteristics after fired were prepared.

Next, an extrusion molding machine which includes one extrusion mechanism of screw type for extruding the first ceramic raw material being disposed facing to the middle portion concentric with the center point of the inlet end surface of the die and having a diameter of 90 mm, and another extrusion mechanism of screw type for extruding the second ceramic raw material, having the guide portion connected to the outer peripheral portion concentric with the middle portion of the above-described die was used. The respective ceramic raw materials together with the medium were fed into the respective screw type extrusion mechanisms. The kneading and the extrusion molding of the obtained puddles were synchronized and performed in the respective extrusion mechanisms to prepare the molded body of the honeycomb structural body. In this case, the dies having different cell structures were used in the middle portion and outer peripheral portion.

Next, the obtained molded body was dried by the microwave, and subsequently the through channels of the honeycomb section formed of the first ceramic raw material were alternately plugged at the opposite ends through which the holes extend, and fired. Next, the catalyst containing Pt as the major component was loaded on the partition walls of the honeycomb section formed of the second ceramic raw material to obtain the columnar honeycomb structural body in which the honeycomb section formed of the first ceramic raw material was disposed in a columnar region concentric with the honeycomb structural body and having a diameter of 90 mm and which had a length of 152 mm, diameter of 144 mm.

The characteristics of the obtained honeycomb structural body were checked. The honeycomb section formed of the first ceramic raw material had an average pore diameter of 10 μm, porosity of 45%, water absorption of 27%, partition wall thickness of 0.3 mm, and cell density of 0.310 cell/mm$^2$ (200 cells/square inch), and the sectional shape of the through channel in the diametric direction was quadrangular. The honeycomb section formed of the second ceramic raw material had an average pore diameter of 4 μm, porosity of 20%, water absorption of 9%, partition wall thickness of 0.15 mm, and cell density of 0.620 cell/mm$^2$ (400 cells/square inch), and the sectional shape of the through channel in the diametric direction was hexagonal.

Moreover, as shown in FIG. 21, the honeycomb structural body 1 was held in the metal case 30, and the exhaust tube 34 of the 2400 cc diesel engine was disposed for the first honeycomb section 11 formed of the first ceramic raw material to prepare the exhaust gas purification apparatus.

The exhaust gas was charged via the exhaust gas introductory path 37 formed by the outer wall of the exhaust tube 34 and the inner wall of the metal case, passed through the second honeycomb section 10 formed of the second ceramic raw material to function as the catalytic body for converting NO to $NO_2$, and the first honeycomb section 11 formed of the first ceramic raw material to function as the filter for trapping and removing the particulate material in order, and purified. Then, the superior exhaust gas purification performance was recognized. Moreover, the tested honeycomb structural body was checked for the damage, deformation, and the like. Then, the damages such as the peels and cracks, and the deformation of the through channel were not recognized at all in the structural body including the bonded portion of both the honeycomb sections. It is to be noted that the arrows in FIG. 21 indicate the proceeding direction of the exhaust gas.

Example 3

First, as the ceramic raw materials, the first ceramic raw material and second ceramic raw material formed of the cordierite materials having the different characteristics after fired were prepared.

Next, the extrusion molding machine which includes one extrusion mechanism of screw type for extruding the first ceramic raw material being disposed facing to the middle portion of the die , and another extrusion mechanism of screw type including a plurality of screws to extrude the second ceramic raw material, disposed in the outer peripheral portion of the one extrusion mechanism of screw type was used. The respective ceramic raw materials were fed into the separate screw type extrusion mechanisms. The kneading of the respective ceramic raw materials and the extrusion of the obtained puddles were synchronized and performed in the respective extrusion mechanisms to prepare the molded body of the honeycomb structural body. In this case, the dies having different cell structures were used in the middle portion and outer peripheral portion.

Next, after the obtained molded body was dried and fired, the catalyst containing Pt and Pd as the major components was loaded on the partition walls of the honeycomb section formed of the second ceramic raw material, and the adsorption layer containing zeolite ZSM-5 (manufactured by The PQ Co., Ltd.) which was the major component was disposed on the partition wall of the honeycomb section formed of the first ceramic raw material. The columnar honeycomb structural body having a length of 152 mm and diameter of 144 m was obtained in which the honeycomb section formed of the first ceramic raw material was disposed in the columnar region concentric with the honeycomb structural body and having a diameter of 45 mm.

The characteristics of the obtained honeycomb structural body were checked. The honeycomb section formed of the first ceramic raw material had an average pore diameter of 3 μm, water absorption of 10%, porosity of 20%, partition wall thickness of 150 μm, and cell density of 0.620 cell/mm$^2$ (400 cells/square inch), and the sectional shape of the through channel in the diametric direction was triangular. The honeycomb section formed of the second ceramic raw material had an average pore diameter of 7 μm, water absorption of 22%, porosity of 35%, partition wall thickness of 100 μm, and cell density of 0.465 cell/mm$^2$ (300 cells/square inch), and the sectional shape of the through channel in the diametric direction was hexagonal.

Moreover, the honeycomb structural body was held in the metal case, and the exhaust tube of a 3000 cc gasoline engine was disposed for one end of the honeycomb section to prepare the exhaust gas purification apparatus.

The exhaust gas was charged into the second honeycomb section formed of the second ceramic raw material to function as a three-way catalytic body for oxidizing/reducing HC, CO, $NO_x$, and the first honeycomb section formed of the first ceramic raw material to function as the adsorbent for adsorbing the hydrocarbon components, and the exhaust gas was purified. Then, the superior exhaust gas purification performance was recognized. Moreover, the tested honeycomb structural body was checked for the damage, deformation, and the like. Then, the damages such as the peels and cracks, and the deformation of the through channel were not recognized at all in the structural body including the bonded portion of both the honeycomb sections.

Comparative Example 1

The columnar honeycomb structural body having a length of 203 mm and diameter of 190 mm was obtained in the same manner as in Example 1 except that the raw materials formed of one type of cordierite material having the same characteristics after fired were used as the ceramic raw materials and the die entirely including the same cell structure was used.

The characteristics of the obtained honeycomb structural body were checked. The whole honeycomb structural body had an average pore diameter of 7 μm, water absorption of 22%, porosity of 35%, partition wall thickness of 0.25 mm, and cell density of 0.465 cell/mm² (300 cells/square inch), and the sectional shape of the through channel in the diametric direction was quadrangular.

Moreover, as shown in FIG. 21, the honeycomb structural body 1 was held in the metal case 30, and the exhaust tube 34 of the 2400 cc diesel engine was attached for the first honeycomb section 11 formed of the first ceramic raw material to prepare the exhaust gas purification apparatus.

The exhaust gas was charged via the exhaust gas introductory path 37 formed by the outer wall of the exhaust tube 34 and the inner wall of the metal case, passed through the second honeycomb section 10 allowed to function as the catalytic body for converting NO to $NO_2$, and the first honeycomb section 11 allowed to function as the filter for trapping and removing the particulate material, and purified. Then, pressure loss of the first honeycomb section 11 allowed to function as the filter was larger by three times or more as compared with the honeycomb structural body of Example 1, and the exhaust gas purification apparatus did not sufficiently function. It is to be noted that the arrows in FIG. 21 indicate the proceeding direction of the exhaust gas.

Example 4

First, as the ceramic raw materials, the first ceramic raw material and second ceramic raw material formed of the cordierite materials having different characteristics after fired were prepared.

Next, the respective ceramic raw materials together with water used as the medium were fed into the different vacuum pug millpug mills to knead and mold the respective ceramic raw materials with water, and the puddle having a columnar shape with a diameter of 150 mm and formed of the first ceramic raw material, and the puddle having the flat plate shape with a width of 475 mm and thickness of 40 mm and formed of the second ceramic raw material were obtained.

Next, the puddle having the flat plate shape and formed of the second ceramic raw material was wound around the puddle having the columnar shape and formed of the first ceramic raw material to prepare the integrated composite puddle.

Subsequently, the obtained columnar composite puddle was put into the ram type extruder in which the dies different in the cell structure were disposed in the middle portion having a diameter of 120 mm and the outer peripheral portion. The extrusion molding was carried out to prepare the molded body in which the first honeycomb section formed of the first ceramic raw material was disposed in the middle portion concentric with the honeycomb structural body and having a diameter of 120 mm and the second honeycomb section formed of the second ceramic raw material was disposed in the outer peripheral portion disposed adjacent to the middle portion.

Next, the obtained molded body was dried by the hot air and microwave, and subsequently the through channels of the first honeycomb section disposed in the middle portion were alternately plugged at the opposite ends through which the holes extend, and fired.

Next, one end of the obtained fired body was cut, the columnar convex structure concentric with the honeycomb structural body and having an outer diameter of 120 mm and height of 50 mm was disposed facing to the first honeycomb section, and the outer peripheral side surface of the convex structure was coated with a cement material.

Next, the catalyst containing Pt as the major component was loaded on the partition walls of the second honeycomb section disposed in the outer peripheral portion to obtain the columnar honeycomb structural body including the convex structure on one end and having a length of 203 mm, diameter of 190 mm.

The characteristics of the obtained honeycomb structural body were checked. The first honeycomb section disposed in the middle portion had an average pore diameter of 30 μm, water absorption of 91%, porosity of 70%, partition wall thickness of 0.25 mm, and cell density of 0.465 cell/mm² (300 cells/square inch), and the sectional shape of the through channel in the diametric direction was quadrangular. The second honeycomb section disposed in the outer peripheral portion had an average pore diameter of 5 μm, water absorption of 17%, porosity of 30%, partition wall thickness of 0.1 mm, and cell density of 0.93 cell/mm² (600 cells/square inch), and the sectional shape of the through channel in the diametric direction was quadrangular.

Moreover, as shown in FIG. 13, the exhaust tube disposed inside the metal case (for the 2400 cc diesel engine) was connected to the convex structure 6 of the honeycomb structural body 1 via a non-intumescentintumescent ceramic mat 36 formed of a mullite fiber to prepare the canning structural body 41.

The canning structural body 41 was used as the exhaust gas purification apparatus. Then, the exhaust gas passed through the second honeycomb section (functioning as the catalytic body for converting NO to $NO_2$) 11 disposed in the outer peripheral portion, and the first honeycomb section (functioning as the filter for trapping and removing the particulate material in the exhaust gas) 10 disposed in the middle portion in order without leaking from the desired channel. Then, the superior exhaust gas purification performance was recognized. Moreover, when the canning structural body 41 was subjected to a heat vibration test, the displacement of the exhaust tube 34, the damages of the honeycomb structural body 1, or the like was not recognized at all. It is to be noted that arrows in FIG. 13 indicate the proceeding direction of the exhaust gas.

Example 5

First, as the ceramic raw materials, the first ceramic raw material and second ceramic raw material formed of the silicon carbide materials having the different characteristics after fired were prepared.

Next, the respective ceramic raw materials together with water used as the medium were fed into the different vacuum pug mills to knead and mold the respective ceramic raw materials with water, and the puddle having a columnar shape with a diameter of 90 mm and formed of the first ceramic raw material, and the puddle having the flat plate shape with a width of 283 mm and thickness of 27 mm and formed of the second ceramic raw material were obtained.

Next, the puddle having the flat plate shape and formed of the second ceramic raw material was wound around the puddle having the columnar shape and formed of the first ceramic raw material to prepare the integrated composite puddle.

Subsequently, the obtained columnar composite puddle was put into the ram type extruder in which the dies different in the cell structure were disposed in the middle portion having a diameter of 90 mm and the outer peripheral portion. The extrusion molding was carried out to prepare the molded body in which the first honeycomb section formed of the first ceramic raw material was disposed in the middle portion concentric with the honeycomb structural body and having a diameter of 90 mm and the second honeycomb section formed of the second ceramic raw material was disposed in the outer peripheral portion disposed adjacent to the middle portion.

Next, the obtained molded body was dried by the hot air and microwave, and subsequently the through channels of the first honeycomb section disposed in the middle portion were alternately plugged at the opposite ends through which the holes extend, and fired.

Next, one end of the obtained molded body was cut, the columnar concave structure concentric with the honeycomb structural body and having an outer diameter of 90 mm and depth of 40 mm was disposed facing to the first honeycomb section in the middle portion of the end, and the inner peripheral side surface of the concave structure was coated with the cement material.

Next, the catalyst containing Pt as the major component was loaded on the partition walls of the second honeycomb section disposed in the outer peripheral portion to obtain the honeycomb structural body including the concave structure in one end and having a length of 152 mm, diameter of 144 mm.

The characteristics of the obtained honeycomb structural body were checked. The first honeycomb section formed of the first ceramic raw material had an average pore diameter of 10 μm, porosity of 45%, water absorption of 27%, partition wall thickness of 0.3 mm, and cell density of 0.310 cell/mm² (200 cells/square inch), and the sectional shape of the through channel in the diametric direction was quadrangular. The second honeycomb section formed of the second ceramic raw material had an average pore diameter of 4 μm, water absorption of 20%, porosity of 9%, partition wall thickness of 0.15 mm, and cell density of 0.620 cell/mm² (400 cells/square inch), and the sectional shape of the through channel in the diametric direction was hexagonal.

Moreover, as shown in FIG. 14, the exhaust tube disposed inside the metal case (for the 3000 cc diesel engine) was connected to the concave structure 8 of the honeycomb structural body 1 via the non-intumescent ceramic mat 36 formed of the mullite fiber to prepare the canning structural body 41.

The canning structural body 41 was used as the exhaust gas purification apparatus. Then, the exhaust gas passed through the second honeycomb section (functioning as the catalytic body for converting NO to $NO_2$) 11 disposed in the outer peripheral portion, and the first honeycomb section (functioning as the filter for trapping and removing the particulate material in the exhaust gas) 10 disposed in the middle portion in order without leaking from the desired channel. Then, the superior exhaust gas purification performance was recognized.

Moreover, when the canning structural body 41 was subjected to the heat vibration test, the displacement of the exhaust tube 34, the damages of the honeycomb structural body 1, or the like was not recognized at all. It is to be noted that arrows in FIG. 14 indicate the proceeding direction of the exhaust gas.

Example 6

The honeycomb structural body was obtained in the same manner as in Example 1 except that one end of the molded body obtained by the extrusion molding in Example 1 was cut to dispose the convex structure having the tapered shape concentric with the honeycomb structural body including a slope whose inclination was 40 degrees (angle of the tip end held by the slope was 100 degrees) and including the planar portion with a diameter of 80 mm in the tip end and that the outer peripheral side surface of the convex structure was not coated with a cement material.

Moreover, as shown in FIG. 15, for the slope 23 of the convex structure 6 disposed in the honeycomb structural body 1, the exhaust tube (for the 3000 cc diesel engine) 34 having a spreading shape whose end 35 was bent along the inclination of the slope 23 and having an inner diameter of 120 mm was allowed to abut on the first honeycomb section (having a diameter of 120 mm and formed of the first ceramic material) 10 disposed in the middle portion of the honeycomb structural body 1 to prepare the canning structural body 41.

The canning structural body 41 was used. Then, the exhaust gas passed through the second honeycomb section (functioning as the catalytic body for converting NO to $NO_2$) 11 disposed in the outer peripheral portion, and the first honeycomb section (functioning as the filter for trapping and removing the particulate material in the exhaust gas) 10 disposed in the middle portion in order without leaking from the desired channel. Then, the superior exhaust gas purification performance was recognized. Moreover, when the canning structural body 41 was subjected to the heat vibration test, the displacement of the exhaust tube, the damages of the honeycomb structural body 1, or the like was not recognized at all. It is to be noted that arrows in FIG. 15 indicate the proceeding direction of the exhaust gas.

Comparative Example 2

The honeycomb structural body and the exhaust gas purification apparatus were obtained in the same manner as in Example 4 except that the convex or concave structure was not disposed in either of the opposite ends through which the through channels extended.

When the obtained exhaust gas purification apparatus was used, any problem did not especially occur in a first stage of the use. However, when the heat vibration test was carried out, the leak of a part of the exhaust gas on the side of an exhaust gas exhaust path from the exhaust gas introductory path was recognized. Moreover, when the displacement of the exhaust tube was recognized after the heat vibration test, a displacement of 3 mm was recognized.

The present invention has concretely been described above, but the present invention can variously be changed, modified, and improved based on knowledge of a person skilled in the art without departing from the scope.

INDUSTRIAL APPLICABILITY

As described above, according to the present invention, there can be provided a honeycomb structural body which can fulfill different high performances as requested for each honeycomb section and in which any local stress concentration by shape mismatch of each honeycomb section or presence of a bond material does not occur and which is high in reliability at the time of use, and the like. Moreover, according to the present invention, there can be provided a honeycomb structural body and canning structural body in which to impart different functions for each honeycomb section, fluids such as exhaust gas is charged into a desired portion without leaking to a path other than a desired path even by the use for a long time and which can fulfill high performances of exhaust gas purification, heat exchange, and the like. Furthermore, according to the present invention, there can be provided a manufacturing method in which the honeycomb structural body having the superior characteristics can be manufactured by a simple and secure process at low cost.

It is to be noted that the honeycomb structural body and canning structural body of the present invention can preferably be applied especially to an exhaust gas purification system, heat exchanger, solid electrolytic battery, thermoacoustic engine of an acoustic wave cooling apparatus, and the like.

The invention claimed is:

1. A honeycomb structural body comprising: a plurality of through channels formed by a plurality of partition walls extending in an axial direction from a first axial end of the honeycomb structural body to a second axial end thereof, wherein
the honeycomb structural body is constituted of a plurality of honeycomb sections formed of materials having different characteristics, and the plurality of honeycomb sections are directly bonded to and integrated with one another,
the honeycomb structural body is formed as an integrated structure by extrusion, and
at least one said axial end of the honeycomb structural body includes a convex structure or a concave structure.

2. The honeycomb structural body according to claim 1, wherein said plurality of honeycomb sections formed of materials which have different characteristics comprise: a first honeycomb section disposed in a middle region including a center axis of the honeycomb structural body; and a second honeycomb section disposed in an outer peripheral region which surrounds the middle region and which is disposed adjacent to the middle region.

3. The honeycomb structural body according to claim 1, wherein said plurality of honeycomb sections are constituted of materials which are different from one another in at least one of porosity, average pore diameter, and water absorption.

4. The honeycomb structural body according to claim 1, wherein the materials constituting said plurality of honeycomb sections have a porosity of 5 to 80%.

5. The honeycomb structural body according to claim 1, wherein the materials constituting said plurality of honeycomb sections have an average pore diameter of 0.5 to 100 μm.

6. The honeycomb structural body according to claim 1, wherein the materials constituting said plurality of honeycomb sections have a water absorption of 1 to 95%.

7. The honeycomb structural body according to claim 1, wherein the honeycomb structural body is constituted of said plurality of honeycomb sections which differ in at least one of cell density, partition wall thickness, and sectional shape of the through channels in a diametric direction.

8. The honeycomb structural body according to claim 1, wherein a plurality of honeycomb sections different in the cell structure are disposed substantially facing to the plurality of honeycomb sections formed of the materials having the different characteristics.

9. The honeycomb structural body according to claim 1, wherein the plurality of honeycomb sections have a cell density of 0.155 to 3.101 cells/mm$^2$ (100 to 2000 cells/square inch).

10. The honeycomb structural body according to claim 1, wherein the partition walls of said plurality of honeycomb sections have a thickness of 25 to 500 μm.

11. The honeycomb structural body according to claim 1, wherein the material constituting said plurality of honeycomb sections is at least one of cordierite, silicon carbide, silicon nitride, alumina, mullite, lithium aluminum silicate, aluminum titanate, and zirconia.

12. The honeycomb structural body according to claim 1, wherein some of said plurality of honeycomb sections carry a metal having a catalytic capability on the partition walls.

13. The honeycomb structural body according to claim 1, wherein some of said plurality of honeycomb sections include an adsorption layer for adsorbing hydrocarbon on the partition walls.

14. The honeycomb structural body according to claim 1, wherein some of said plurality of honeycomb sections include partition walls having filter capabilities, and for the through channels formed by the partition walls having the filter capabilities at said axial ends, predetermined through channels are plugged at one axial end, and the remaining through channels are plugged at the other axial end.

15. A method for trapping and removing particulate materials included in a dust-containing fluid, comprising:
utilizing the honeycomb structural body of claim 14.

16. The honeycomb structural body according to claim 1, wherein the convex structure or the concave structure is disposed in an outer peripheral portion or a middle portion of at least one said axial end.

17. The honeycomb structural body according to claim 1, wherein said convex structure is present and a step of the convex structure has a size of 2 mm or more, and the size is not more than a diameter in a root position in the convex structure.

18. The honeycomb structural body according to claim 1, wherein said concave structure is present and a step of the concave structure has a size of 2 mm or more, and the size is not more than an inner diameter in a bottom position in the concave structure.

19. The honeycomb structural body according to claim 1, wherein the convex structure or the concave structure has a tapered shape.

20. The honeycomb structural body according to claim 19, wherein the said convex structure is present and has a tapered shape which includes a planar portion at a tip end thereof.

21. The honeycomb structural body according to claim 19, wherein said concave structure is present and has a tapered shape which includes a planar portion at its bottom end.

22. The honeycomb structural body according to claim 19, wherein the convex structure or the concave structure having the tapered shape is disposed at one said axial end and the convex structure or the concave structure whose sectional shape in a diametric direction is polygonal or circular is disposed at the other axial end.

23. The honeycomb structural body according to claim 1, wherein an outer peripheral side surface of the convex structure, or an inner peripheral side surface of the concave structure, is coated with a ceramic material.

24. A canning structural body comprising: a honeycomb structural body in which a plurality of through channels are formed by a plurality of partition walls extending in an axial direction from a first axial end of the honeycomb structural body to a second axial end thereof and a case in which the honeycomb structural body is held and which includes an exhaust tube disposed facing to a part of the honeycomb structural body, the honeycomb structural body being formed as an integrated structure by extrusion, and being constituted of a plurality of honeycomb sections formed of materials which have different characteristics;

characterized in that at least one said axial end of the honeycomb structural body includes a convex structure or a concave structure, and the exhaust tube is attached to a portion of said axial end including the convex structure or the concave structure.

25. The canning structural body according to claim 24, wherein the exhaust tube is attached to a portion of said axial end including the convex structure or the concave structure via a holding material.

26. The canning structural body according to claim 24, wherein the convex structure or the concave structure is disposed in an outer peripheral portion or middle portion of at least one said axial end.

27. The canning structural body according to claim 24, wherein said convex structure is present and a step in the convex structure has a size of 2 mm or more, and the size is not more than a diameter of the convex structure in a root position.

28. The canning structural body according to claim 24, wherein said concave structure is present and a step in the concave structure has a size of 2 mm or more, and the size is not more than an inner diameter of the concave structure in a bottom position.

29. The canning structural body according to claim 24, wherein the convex structure or the concave structure has a tapered shape.

30. The canning structural body according to claim 29, wherein said convex structure is present and has a tapered shape which includes a planar portion at a tip end thereof.

31. The canning structural body according to claim 29, wherein said concave structure is present and has a tapered shape which includes a planar portion at its bottom end.

32. The canning structural body according to claim 29, wherein the convex structure or the concave structure having the tapered shape is disposed at one said axial end and the convex structure or the concave structure whose sectional shape in a diametric direction is the same in an axial direction such as a prismatic shape and a columnar shape is disposed at the other axial end.

33. The canning structural body according to claim 29, wherein an end of the exhaust tube has a spreading shape or a narrowing shape substantially extending along a slope of the convex structure or the concave structure having the tapered shape.

34. The canning structural body according to claim 24, wherein if said convex structure is present, an outer peripheral side surface of the convex structure disposed at said axial end of the honeycomb structural body is coated with a ceramic material, and if said concave structure is present, an inner peripheral side surface of the concave structure is coated with a ceramic material.

35. The canning structural body according to claim 24, wherein the material constituting the honeycomb structural body is at least one of cordierite, silicon carbide, silicon nitride, alumina, mullite, lithium aluminum silicate, aluminum titanate, and zirconia.

36. The canning structural body according to claim 24, wherein the material characteristic which differs with the plurality of honeycomb sections is at least one of porosity, average pore diameter, and water absorption.

37. The canning structural body according to claim 24, wherein the honeycomb structural body is constituted of a plurality of honeycomb sections having different cell structures.

38. The canning structural body according to claim 37, wherein the plurality of honeycomb sections differs in at least one of cell density, partition wall thickness, and sectional shape of a diametric direction in the through channel.

39. The canning structural body according to claim 37, wherein the plurality of honeycomb sections including the different cell structures are disposed substantially facing to the plurality of honeycomb sections formed of the materials having the different characteristics.

40. The canning structural body according to claim 24, wherein the plurality of honeycomb sections are directly bonded to and integrated with one another.

41. The canning structural body according to claim 24, wherein some of said plurality of honeycomb sections carry a metal having a catalytic capability in the partition walls.

42. The canning structural body according to claim 24, wherein some of said plurality of honeycomb sections include an adsorption layer for adsorbing hydrocarbon on the partition walls.

43. The canning structural body according to claim 24, wherein some of said plurality of honeycomb sections include partition walls having filter capabilities, and for the through channels formed by the partition walls having the filter capabilities at said axial ends, predetermined through channels are plugged on one axial end, and the remaining through channels are plugged at the other axial end.

44. The canning structural body according to claim 43, wherein some of the plurality of honeycomb sections are configured to trap and remove particulate materials included in a dust-containing fluid.

45. The canning structural body according to claim 24, wherein the case further comprises: a channel change member which changes a channel of a fluid which has exited out of one honeycomb section to charge the fluid into another honeycomb section.

46. A method of manufacturing a honeycomb structural body, comprising the steps of:

providing a plurality of raw materials containing a ceramic material and having different characteristics after firing as raw material mainly containing the ceramic material;

kneading the plurality of raw materials with a medium in different kneading mechanisms to obtain a plurality of puddles having different characteristics after firing;

guiding the plurality of puddles into different positions of a die, and simultaneously extruding the plurality of puddles in the die, to obtain the honeycomb structural body; and cutting the honeycomb structural body so that at least one axial end of the honeycomb structural body includes a convex structure or a concave structure.

47. The method according to claim 46, further comprising the steps of: guiding a composite puddle obtained by integrating the plurality of puddles into the die; and simultaneously extruding the plurality of puddles.

48. The method according to claim 47, wherein said composite puddle is obtained by disposing at least a first one or more of said puddles having characteristics after fired different from those of one puddle around a second one of said puddles formed of one material, wherein said first one or more of said puddles have characteristics after firing different from those of said second one of said puddles.

49. The method according to claim 46, further comprising the steps of: guiding the plurality of puddles into the different positions of the die by different extrusion mechanisms to simultaneously extrude the puddles.

50. The method according to claim 49, wherein the extrusion mechanism is a screw type extrusion mechanism which continuously carries out a series of the kneading of the raw material mainly containing the ceramic material with the medium and the extrusion of the puddle obtained by the kneading.

51. The method according to claim 46, wherein the plurality of raw materials differ in at least one of the characteristics after fired, such as a porosity, an average pore diameter, and a water absorption.

52. The method according to claim 46, wherein for the die, at least one of a cell block pitch, a slit width, and a sectional shape of a cell block in a direction perpendicular to an extruding direction substantially differs with each portion into which the respective puddles having the different characteristics after fired are charged.

* * * * *